United States Patent
Yashima et al.

(10) Patent No.: US 6,830,120 B1
(45) Date of Patent: Dec. 14, 2004

(54) FLOOR WORKING MACHINE WITH A WORKING IMPLEMENT MOUNTED ON A SELF-PROPELLED VEHICLE FOR ACTING ON FLOOR

(75) Inventors: Takashi Yashima, Osaka (JP); Yasuhiro Ueda, Osaka (JP)

(73) Assignee: Penguin Wax Co., Ltd., Higashinakamoto (JP)

( * ) Notice: Subject to any disclaimer, the term of this patent is extended or adjusted under 35 U.S.C. 154(b) by 0 days.

(21) Appl. No.: 10/042,693

(22) Filed: Jul. 1, 1999

Related U.S. Application Data

(63) Continuation of application No. 08/787,850, filed on Jan. 23, 1997, now abandoned.

(30) Foreign Application Priority Data

Jan. 25, 1996 (JP) .............................................. 8-10578
Oct. 15, 1996 (JP) ............................................. 8-271935

(51) Int. Cl.$^7$ ............................................... B60T 7/16
(52) U.S. Cl. ..................... 180/167; 15/340.1
(58) Field of Search .................. 180/167, 168, 180/169, 204; 701/23, 24, 25, 26, 27, 28; 901/1, 50; 15/340.1; 318/587

(56) References Cited

U.S. PATENT DOCUMENTS

| | | | | |
|---|---|---|---|---|
| 4,674,048 A | * | 6/1987 | Okumura | ..................... 701/25 |
| 5,032,775 A | * | 7/1991 | Mizuno et al. | ................. 701/25 |
| 5,279,672 A | * | 1/1994 | Betker et al. | .................. 134/18 |
| 5,284,522 A | * | 2/1994 | Kobayashi et al. | ..... 180/169 X |
| 5,341,540 A | * | 8/1994 | Soupert et al. | ................ 15/319 |
| 5,353,224 A | * | 10/1994 | Lee et al. | ...................... 701/25 |
| 5,377,106 A | * | 12/1994 | Drunk et al. | .................. 701/25 |
| 5,440,216 A | * | 8/1995 | Kim | ............................ 318/587 |
| 6,615,108 B1 | * | 9/2003 | Peless et al. | ................ 700/245 |

FOREIGN PATENT DOCUMENTS

JP 6131043 * 5/1994

* cited by examiner

Primary Examiner—Bryan Fischmann
(74) Attorney, Agent, or Firm—Fulbright & Jaworski L.L.P.

(57) ABSTRACT

A floor working machine including a self-propelled vehicle body including a working implement for treating a floor surface; U-turn control means for causing the self-propelled vehicle body to make a U-turn automatically to adjust the working implement to a work line adjacent a work line treated before said U-turn; spin turn control means for causing the self-propelled vehicle body to make a spin turn automatically to align said working implement to a work line treated before the spin turn; and running control means for automatically controlling said U-turn control means and the spin turn control means in response to input signals for causing the self-propelled vehicle body to make selectively a U-turn under control of the U-turn control means and a spin turn under control of the spin turn control means.

11 Claims, 20 Drawing Sheets start and U-turn spin turn start spin turn stop turn command

FLOOR WORKING MACHINE WITH A WORKING IMPLEMENT MOUNTED ON A SELF-PROPELLED VEHICLE FOR ACTING ON FLOOR

This application is a continuation of U.S. Ser. No. 08/787,850 filed Jan. 23, 1997, abandoned.

BACKGROUND OF THE INVENTION

1. Field of the Invention

This invention relates to floor working machines, and more particularly to a floor working machine with a working implement mounted on a self-propelled vehicle body, the working implement being a waxing implement, cleaning implement, washing implement, polishing implement or the like for acting on floor surfaces formed of varied materials such as wood, stone, resin, concrete and so on.

2. Descripytion of the Related Art

In treating a floor with a floor working machine of the type noted above, generally, the machine is moved back and forth. For example, the machine is run straight from one end to the other end of a work line, and is turned around at the other end to reverse the direction of travel and place the working implement on a next work line. Then, the machine is run along the next work line in the opposite direction. It is convenient to cause the machine to make a U-turn in order to reverse the machine at the terminal end of each work line and to place the working implement on a next work line. Conventionally, therefore, the direction of travel can be reversed only by U-turns of the floor working machine whether the machine is the non-automatic type running by command signals provided by the operator or the automatic type running automatically based on a running program.

However, it may be necessary to treat certain portions of a floor surface more often than other portions. For example, a portion of a floor surface may be badly worn and stained, requiring more waxing or cleaning operations than the other portions. Further, an area may be left untreated when the working machine deviates from a work line. It is then necessary to run the machine along the work line again to treat this area. In such a case, the working machine must be moved over a long distance when the machine is returned to the work line needing re-treatment after finishing treatment of an entire working range. It may also be difficult to distinguish the area to be re-treated from the other areas. It is therefore advantageous to run the working machine along that work line immediately after reaching the terminal end thereof. For it is unnecessary to move the working machine over a long distance or to locate the area needing re-treatment. However, the conventional working machine having reached the terminal end of a work line must make a large U-turn in order to place the working implement back on the same work line. Thus, it is a time-consuming and inefficient operation to make a positional adjustment for causing the working implement to re-run the same work line.

Moreover, a waxing or cleaning operation may have to be repeated for an entire working range which is in a serious shortage of wax or badly stained. In such a case, the working machine must be moved over a long distance when the machine is returned from to an original, starting position from the terminal end of a final work line. The operation may be repeated efficiently, without moving the machine over a long distance, if the machine is reversed at the terminal end of the final work line to run in the opposite direction from the terminal end. However, in repeating the operation by turning the conventional working machine at the final work line, the machine must make a large U-turn in order to place the working implement back on the final work line. Thus, it is a time-consuming and inefficient operation to make a positional adjustment for causing the working implement to re-run the final work line,

SUMMARY OF THE INVENTION

The object of this invention is to provide a floor working machine capable of efficiently operations whether work lines require repeated treatment or not.

The above object is fulfilled, according to this invention, by a floor working machine comprising a self-propelled vehicle body including a working implement for treating a floor surface; U-turn control means for causing the self-propelled vehicle body to make a U-turn automatically to, adjust the working implement to a work line adjacent a work line treated before the U-turn; spin turn control means for causing the self-propelled vehicle body to make a spin turn automatically to alien the working implement to a work line treated before the spin turn, and running control means for automatically controlling the U-turn control means and the spin turn control means in response to input signals for causing the self-propelled vehicle body to make selectively a U-turn under control of the U-turn control means and a spin turn under control of the spin turn control means.

When there is no need for repeating an operation, such as repeated waxing or repeated cleaning or when no area is left untreated, a signal is inputted manually or automatically to the running control means for causing the machine to make a U-turn. Then, the U-turn control means operates, under automatic control of the running control means, for causing the machine to make a U-turn to adjust the working implement quickly to a work line adjacent a work line treated before the turn. This enables the machine to treat all work lines successively in an efficient manner. When a certain work line is badly worn or stained and requires re-treatment, or when all work lines require re-treatment such as repeated waxing or repeated cleaning, a signal is inputted manually or automatically to the running control means at an appropriate time for causing the machine to make a spin turn. Then, the spin turn control means operates under automatic control of the running control means. The machine makes a spin turn to adjust the working implement quickly to a work line treated before the turn. The machine runs along this work line again in the opposite direction to treat the work line properly. The machine may run along all of the work lines in the opposite direction from the terminal end of a final work line to carry out a repeated operation efficiently.

Thus, when there is no need for repeating an operation for part or whole of a working range, the machine may be caused to make a U-turn quickly to assume a proper position for running along a next work line simply by inputting a U-turn signal. In this way, the machine may run along all of the work lines successively for efficient treatment. When a certain work line requires re-treatment, or when an entire working range require re-treatment, the machine may be caused, simply by inputting a spin turn signal, to make a spin turn quickly to assume a proper position for re-running along the work line treated before the turn or for running along the final work line in the opposite direction. In this way, the machine may carry out the operation efficiently though the operation is repeated, by appropriately running along part or all of the work lines.

Moreover, a manual operation for inputting a signal is done with ease since only a U-turn or spin turn signal needs to be inputted to the running control means.

The self-propelled vehicle body may have one dirigible front drive wheel and a pair of right and left non-dirigible, free rotation rear wheels, the spin turn control means being operable to cause the self-propelled vehicle body to make a spin turn about a middle position between the right and left rear wheels by steering sideways and driving the front wheel.

With this construction, when the front wheel is steered sideways and driven, the right and left rear wheels rotate in opposite directions by propelling action of the front wheel. Then the machine makes a spin turn about the middle position between the right and left rear wheels.

Thus, a spin turn is enabled by a simple construction in which the front wheel is dirigible and drivable. This achieves a repeated operation advantageously and at a relatively low cost.

The running control means may include a semi-automatic control unit, the semi-automatic control unit being operable, in response to a U-turn command from a control unit, to control the U-turn control means for causing the self-propelled vehicle body to make a U-turn, and in response to a spin turn command from the control unit, to control the spin turn control means for causing the self-propelled vehicle body to make a spin turn.

With this construction, the operator works while observing a finishing state of the operation, running of the machine and conditions of the floor. If everything is in order, the operator inputs a U-turn signal to the semi-automatic control unit through the control unit when the working machine reaches the terminal end of a work line. Then, the U-turn control means operates under automatic control of the semi-automatic control unit for causing the machine to make a U-turn to adjust the working implement to a work line adjacent the work line treated before the turn. In this way the machine is caused to run along, all work lines. If a certain area is left unwaxed or insufficiently cleaned or a certain work line is badly worn or stained, the operator inputs a spin turn signal to the semi-automatic control unit through the control unit when the working machine reaches the terminal end of the work line. Then, the spin control means operates under automatic control of the semi-automatic control means for causing the machine to make a spin turn to align the working implement to a work line treated before the turn. In this way, the machine is caused to re-run along the work line in the opposite direction. When repeating the operation such as for waxing or polishing the entire working range again, the operator inputs a spin turn signal to the semi-automatic control unit through the control unit when the working machine reaches the terminal end of a final work line. Then, the spin turn control means operates under automatic control of the semi-automatic control means for causing the machine to make a spin turn to adjust the working implement to the terminal end of the final work line. The machine is ready to run along all work lines in the opposite direction from the terminal end of the final work line. Thus, the machine runs along and treats all the work line successively only by effecting a remote control.

Thus, when there is no need for repeating an operation for part or whole of a working range, the machine may be caused to make a U-turn quickly to assume a proper position for running along a next work line simply by inputting a U-turn signal at an appropriate time. In this way, the machine may run along all of the work lines successively for efficient and easy treatment. When a certain work line requires re-treatment, or when an entire working range require re-treatment, the machine may be caused, simply by inputting a spin turn signal at an appropriate time, to make a spin turn quickly to assume a proper position for re-running along the work line treated before the turn or for running along the final work line in the opposite direction. In this way, the machine may carry out the operation efficiently though the operation is repeated, by appropriately running along part or all of the work lines.

The running control means may include a full automatic control unit, the full automatic control unit being operable to control the U-turn control means and the spin turn control means automatically based on a set running program, for causing the self-propelled vehicle body to make U-turns at ends of a working range, and when the running program so requires, for causing the self-propelled vehicle body to make spin turns at predetermined turning positions and run in opposite directions.

That is, a running program is set in which the final work line of all work lines is regarded as a terminal end. Then, the U-turn control means operates under automatic control of the semi-automatic control unit for causing the machine to make a U-turn to adjust the working implement to a next work line. In this way, the machine is caused to run along and properly treat all work lines automatically. The program is set in which the terminal end of the final work line is regarded as the turning position. Then, the U-turn control means operates under automatic control of the semi-automatic control unit for causing the machine to make a U-turn to adjust the working implement to a next work line. In this way, the machine is caused to run along and properly treat all work lines automatically. When the working machine reaches the terminal end of the final work line, the spin turn control means operates under automatic control of the full automatic control means for causing the machine to make a spin turn to adjust the working implement to the terminal end of the final work line. In this way, the machine is caused to run along and treat all of the work lines in the opposite direction from the terminal end of the final work line.

Thus, the entire working range may be treated a predetermined number of times automatically simply by setting and starting a program. The waxing operation is repeated automatically when an entire working range is badly stained or badly needs waxing, and is automatically stopped after one run when the working range is not so badly stained or does not badly need waxing. In this way, appropriate treatment may be given with ease according to conditions of the floor surface. The operation may be repeated by running the machine in the opposite direction from the terminal end of the final work line.

The full automatic control unit may be operable to control the spin turn control means for causing the self-propelled vehicle body to make a spin turn in a direction in which a U-turn is made immediately before the spin turn.

When repeatedly treating the entire working range, the work line from which the machine is turned back is often close to a wall. In such a case, when the machine makes a spin turn about the rear end thereof at the turning position in the opposite direction to the U-turn made immediately before, the front of the machine tends to more from the center of the turn toward the wall and could inadvertently contact the wall. In the construction according to this invention, the spin turn control means, under control of the full automatic control unit causes the machine to make a spin turn in the same direction in which a U-turn is made immediately before the spin turn. The front of the machine therefore moves about the spin center, away from the wall, instead of contacting the wall, when making a spin turn.

Thus, even if the turning position is close to a wall, the machine can make a spin turn without hitting the wall even. The turning position may be set as close to a wall as possible. This feature allows the working machine to operate efficiently, minimizing untreated floor areas left along the wall.

DETAILED DESCRIPTION OF THE PREFERRED EMBODIMENTS

A floor working machine according to this invention will be described in detail with reference to the drawings.

Figure 1:
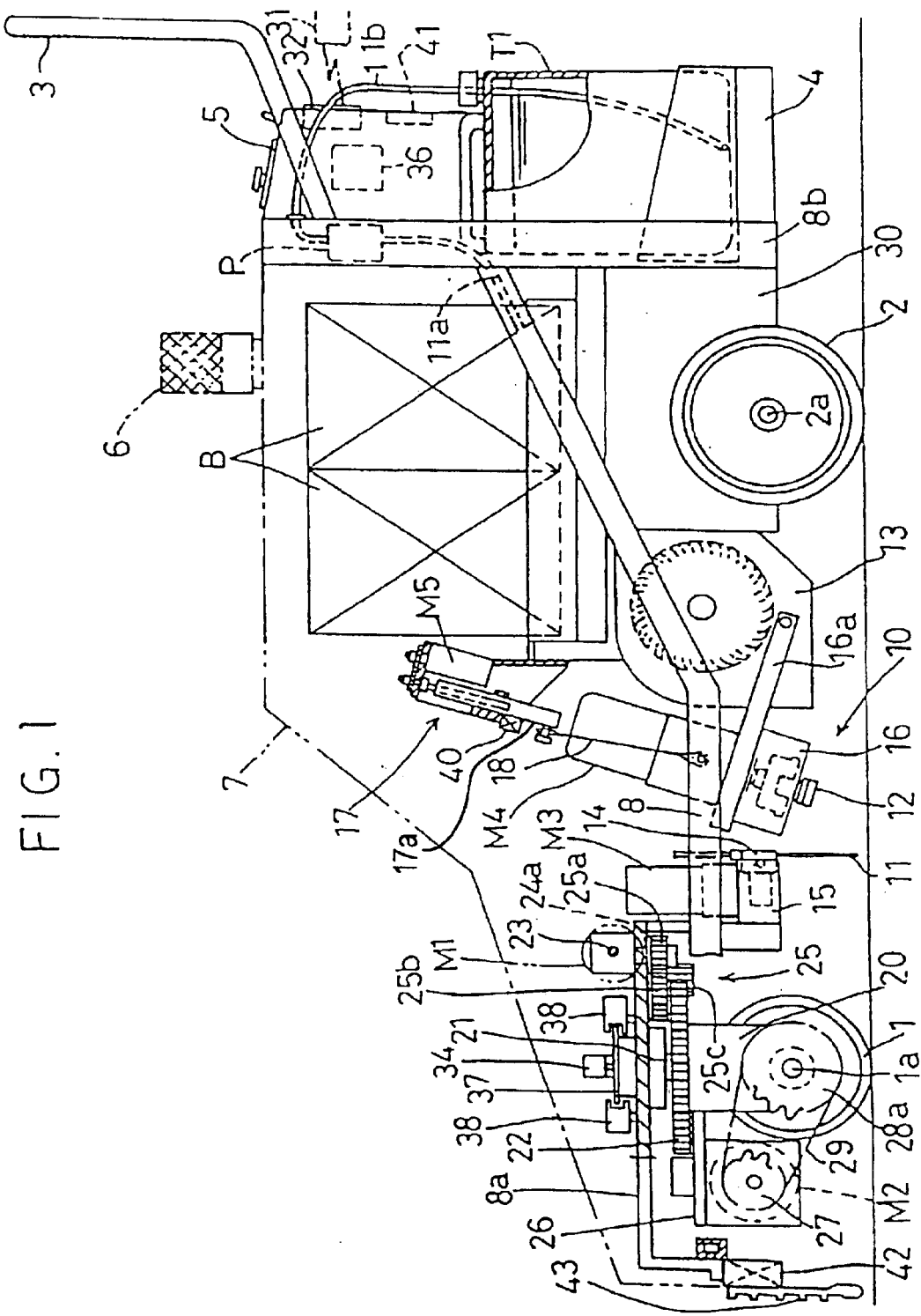
FIG. 1 is a schematic side elevation of a waxing machine with a waxing implement in inoperative state.
Figure 2:
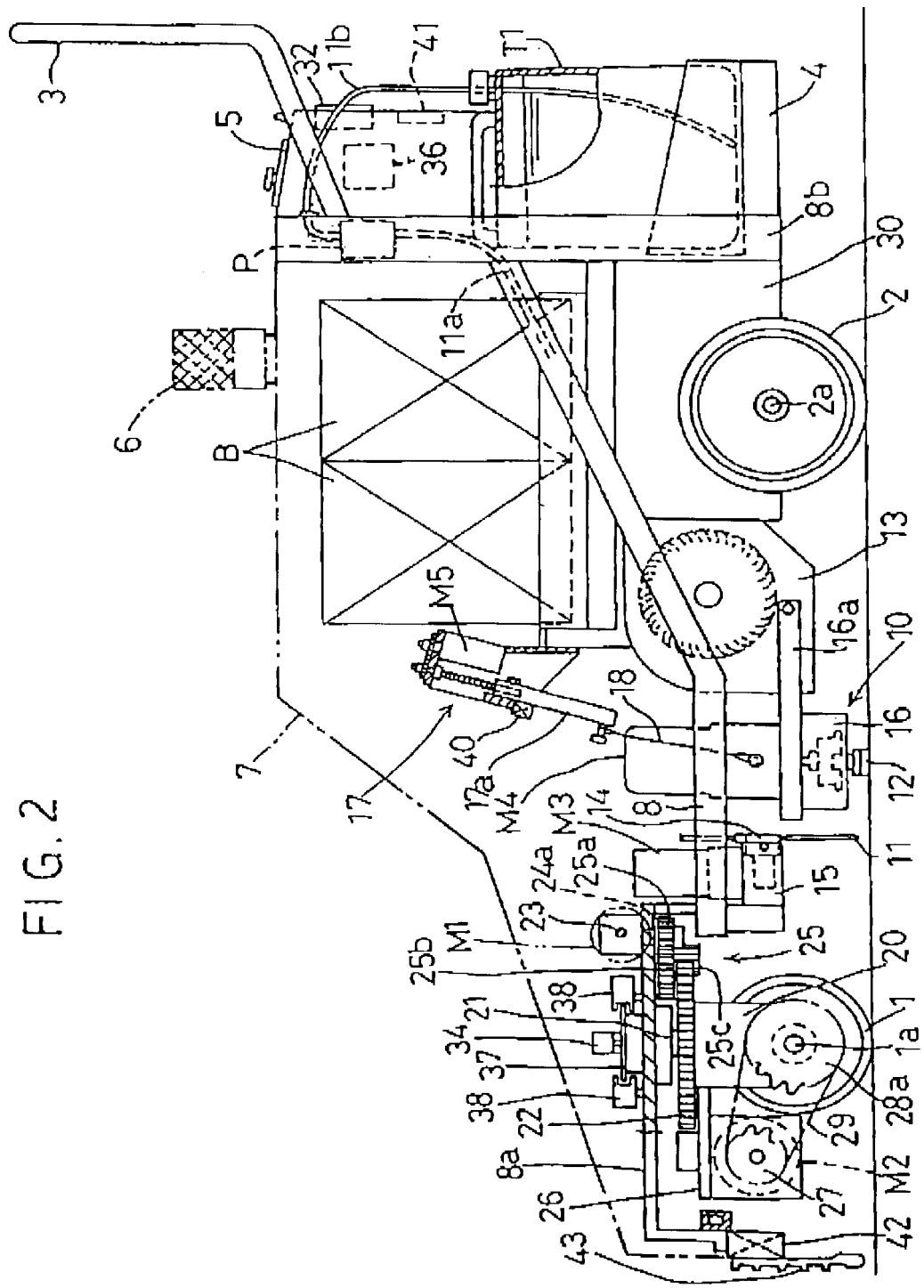
FIG. 2 is a schematic side elevation of the waxing machine with the waxing implement in operative state.
Figure 3:
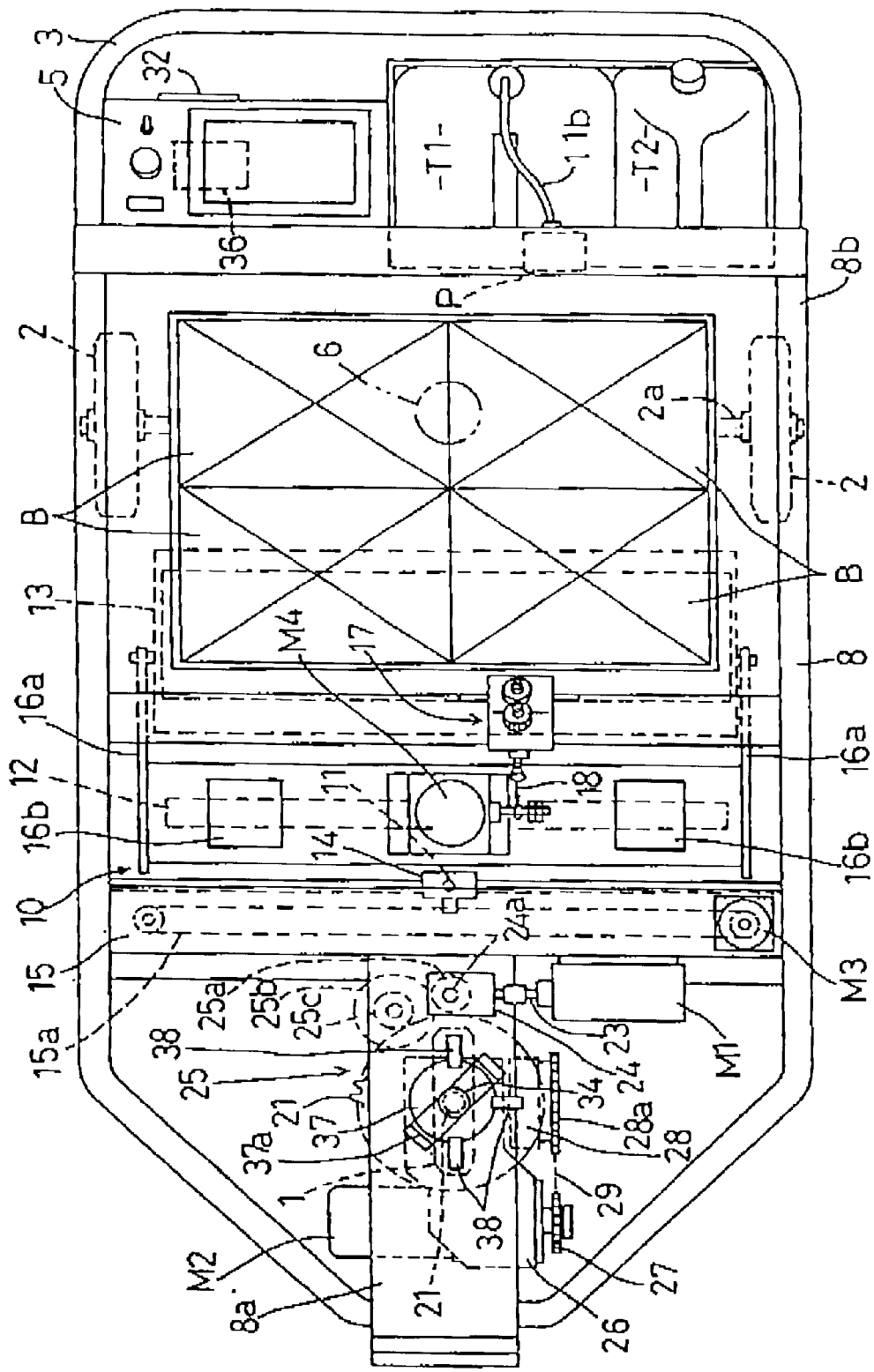
FIG. 3 is a schematic plan view of the waxing implement.

As shown in FIGS. 1 through 3, the floor working machine is self-propelled on one front wheel 1 and a pair of right and left rear wheels 2. The machine has a self-propelled vehicle body controllable by an operator through a handle 3. A waxing implement 10 is disposed between the front and rear wheels of the self-propelled vehicle body, which includes a wax supply nozzle 11, an applicator 12 and a drying fan 13. The self-propelled vehicle body further includes a power supply battery B mounted above and between the rear wheels 2, a tank mount 4 disposed rearwardly of the rear wheels 2 for supporting a wax tank T1 and a cleaning water tank T2, a control panel 5 disposed above the tank mount 4 and having a power switch and a battery meter, an indicator light 6 in the form of a revolving light mounted on the self-propelled vehicle body, and a cover 7 extending over the front wheel 1, waxing apparatus 10 and battery B to be openable through a vertical pivotal movement. The number and positions of wheels are not limited to the construction shown in the drawings.

Figure 4:
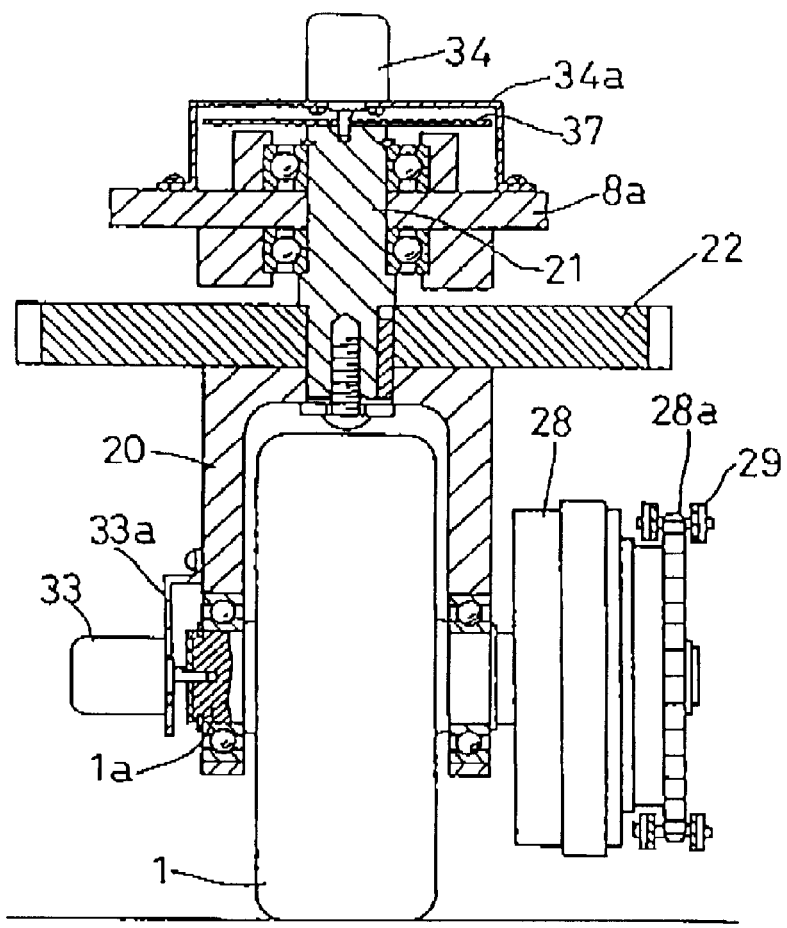
FIG. 4 is a sectional view of a front wheel mounting structure.

As shown in FIGS. 1, 3 and 4, the front wheel 1 is attached to a front portion 8a of a frame 8 of the self-propelled vehicle body through a mounting shaft 21 extending upward from and rotatable with an upper end of a front wheel support 20. Thus, the front wheel 1 is swingable about an axis of the mounting shaft 21 extending vertically of the vehicle body. The front wheel support 20 supports the front wheel 1 through a front axle 1a rotatable with the wheel 1. With this construction, the front-wheel 1 is swingable about the axis of mounting shaft 21 relative to the self-propelled vehicle body to be in a straight running position, a left turning position and a right turning position. A steering gear 22 is mounted on the upper end of front wheel support 20 to be rotatable with the mounting shaft 21. A steering motor M1 is mounted on the front frame portion 8a to be rotatable by power supplied from the battery B. The steering motor M1 has an output shaft 23 extending transversely of the vehicle body. The output shaft 23 is interlocked to the steering gear 22 through a converting mechanism 24 for converting a torque of the output shaft 23 to a torque about an axis extending vertically of the vehicle body, and a reduction mechanism 25 having a plurality of spur gears 25a, 25b, 25c for reducing and transmitting a torque of an output shaft 24a of the converting mechanism 24. When the steering motor M1 is driven, the steering gear 22 rotates the front wheel support 20 to direct the front wheel 1 straight, left or right relative to the self-propelled vehicle body. A propelling motor M2 is mounted on a bracket 26 supported by the front wheel support 20 to be driven by power supplied from the battery B. The propelling motor M2 has an output gear 27 interlocked through a transmission chain 29 to an input gear 28a of an electromagnetic clutch 28 attached to one end of the front axle 1a. The electromagnetic clutch 28 transmits a torque of input gear 28a to the front axle 1a. Thus, the front wheel 1 is driven by the propelling motor M2, and steered by the steering motor M1 to rotate straight or to turn left or right. The right and left rear wheels 2 are attached to one rear axle 2a to be rotatable relative thereto. The rear axle 2a is supported, not to be rotatable, by brackets 30 attached to a rear portion 8b of the vehicle body frame 8. Thus, the right and left rear wheels 2 are non-dirigible, free rotation wheels freely and independently rotatable by friction with a floor surface.

The machine travels straight by operating the steering motor M1 to a straight running position and driving the propelling motor M2. The machine turns left or right by operating the steering motor M1 to a left or right turn position and driving the propelling motor M2. The machine stops running by stopping the propelling motor M2.

The wax supply nozzle 11 is supported by a nozzle support 14 slidably supported by a guide rail (not shown) fixed to the body frame 8 and extending transversely of the vehicle body. The nozzle support 14 is engaged with an endless chain 15a rotatably mounted in a chain case 15 fixed to the body frame 8. Thus, the nozzle support 14 is reciprocable along the guide rail. The endless chain 15a is driven by a nozzle transfer motor M3 attached to one end of the chain case 15. The motor M3 is driven by power supplied from the battery B. A wax supply hose 11a is connected to an upper end of wax supply nozzle 11. The wax supply hose 11a is flexible and its bending enables sideways movement of the wax supply nozzle 11. The wax supply hose 11a is connected to a delivery end of a gear pump P disposed above the tank mount 4 to be driven by power supplied from the battery B. The pump P is connected at an intake end thereof to a suction hose 11*b* removably extending into the wax tank T1 mounted on the tank mount 4. With the suction hose 11*b* connected to the wax tank T1 on the tank mount 4, the gear pump P draws liquid wax from the wax tank T1, and supplies the liquid wax to the wax supply nozzle 11. The wax supply nozzle 11 supplies the liquid wax from wax tank T1 down to the floor surface while reciprocating sideways relative to the self-propelled vehicle body by the torque of nozzle transfer motor M3.

As shown in FIGS. 1 and 2, the applicator 12 is disposed rearwardly of the wax supply nozzle 11, and between the right and left rear wheels 2 as seen longitudinally of the vehicle body, so that the rear wheels 2 move clear of the wax applied. The applicator 12 is supported by a vibration generator 16 including a vibrating motor M4 and weights 16*b*. This vibration generator 16 is vertically oscillatably connected to the drying fan 13 through mounting arms 16*a* extending rearward from a case of the vibration generator 16. The arms 16*a* are pivotally connected at rear ends thereof to a fan case of drying fan 13. Above the drying fan 13 is a screw type lift device 17 operable by a lift motor M5 driven by power from the battery B. The lift device 17 is operable to raise and lower the vibration generator 16 through a suspender cable 18 extending between a lift control 17*a* and the case of vibration generator 16. With this construction, the lift motor M5 moves the applicator 12, along with the vibration generator 16, vertically relative to the self-propelled vehicle body about a transverse axis of connection between the mounting arms 16*a* and the fan case. Thus, the applicator 12 is movable between an upper contained position spaced from the floor surface as shown in FIG. 1 and a lower operative position contacting the floor surface as shown in FIG. 2. The applicator 12 in the lower operative position is pressed on the floor surface by the vibration generator 16 with the weight of vibrating motor M4, weights 16*b* and other components. In this state, the vibration generator with the vibrating motor M4 driven by power from the battery B applies vibration to the applicator 12.

The drying fan 13 is disposed rearwardly of the applicator 12 and is driven by power from the battery B to supply wax drying air flows at room temperature to the floor surface rearwardly of the applicator 12.

Thus, the waxing apparatus 10 is in operative state when the pump P, nozzle transfer motor M3, vibrating motor M4 and drying fan 13 are driven and the lift motor M5 is operated to a lowering position. The liquid wax stored in the wax tank T1 is supplied through the wax supply nozzle 11 to the floor surface in a zigzag within a width determined by a transverse range of reciprocation of the wax supply nozzle 11 and as a result of ring of the machine. The applicator 12 then spreads the wax over a floor area having a width C determined by a length of the applicator 12 transversely of the vehicle body, and the drying fan 13 dries the wax with air flows. At this time, the applicator 12 vibrates to spread the wax effectively and uniformly over the floor surface in a thickness to dry with ease. The waxing apparatus 10 becomes inoperative by stopping the pump P and operating the lift motor M5 to a raising position.

Figure 6:
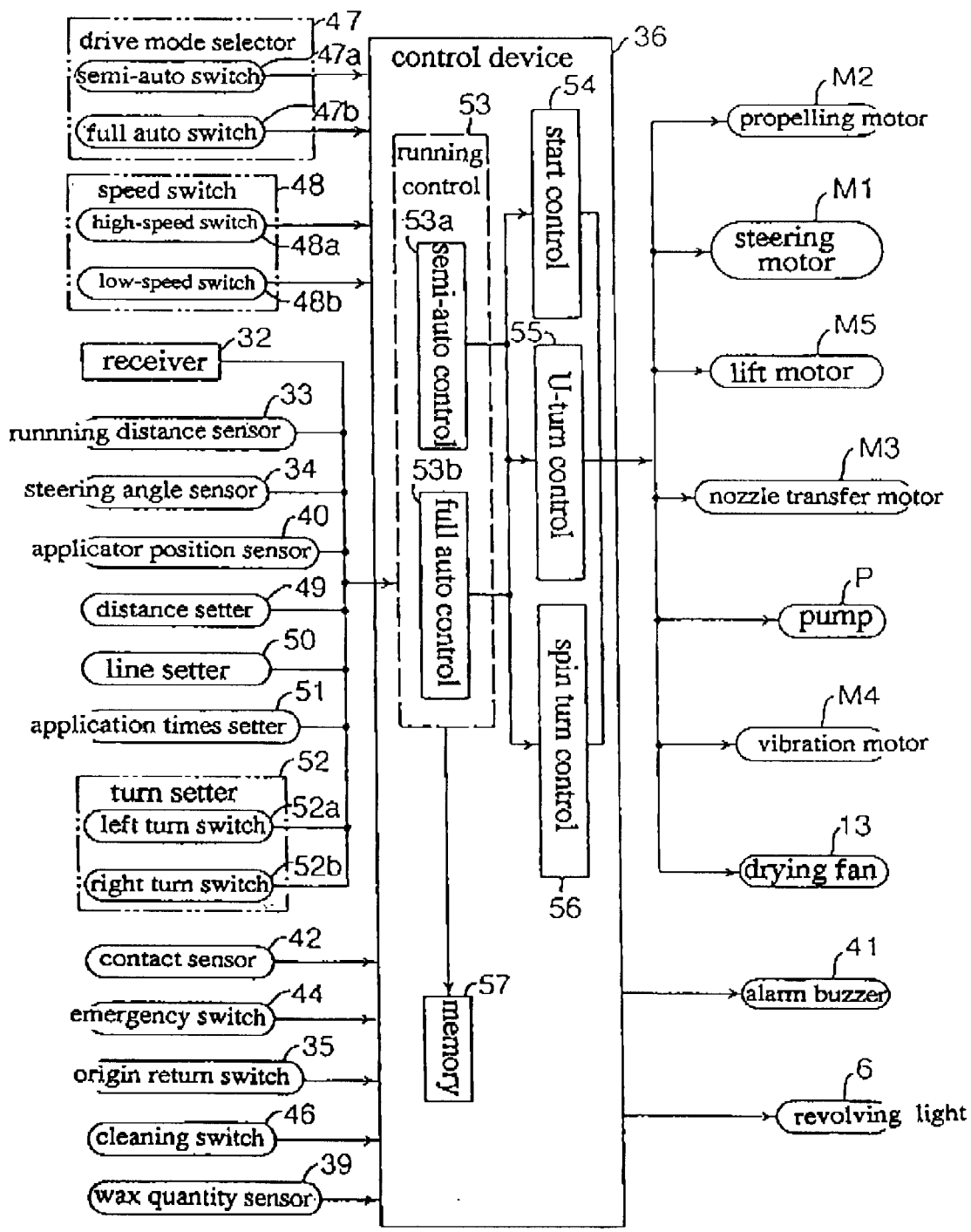
FIG. 6 is a block diagram of a control system.

As shown in FIG. 6, the propelling motor M2, steering motor M1, lift motor M5, nozzle transfer motor M3, vibrating motor M4, pump P and drying fan 13 are connected to a control device 36. The control device 36 is disposed in the self-propelled vehicle body below the control panel 5. Further, the control device 36 is connected to a semi-automatic switch 47*a* and a full automatic switch 47*b* of an operating mode selecting mechanism 47, a high-speed switch 48*a* and a low-speed switch 48*b* of a speed switching mechanism 48, a receiver 32, a running distance sensor 33, a steering angle sensor 34, an applicator position sensor 40, a distance setting mechanism 49, a number of lines setting mechanism 50, a number of application times setting mechanism 51, a left turn switch 52*a* and a right turn switch 52*b* of a turn setting mechanism 52, an origin return switch 35 and a wax quantity sensor 39. The control device 36 comprises a microcomputer including a running control device 53 having a semiautomatic control unit 53*a* and a full automatic control unit 53*b*, a start control device 54, a U-turn control device 55, a spin turn control device 56 and a memory 57.

Figure 5:
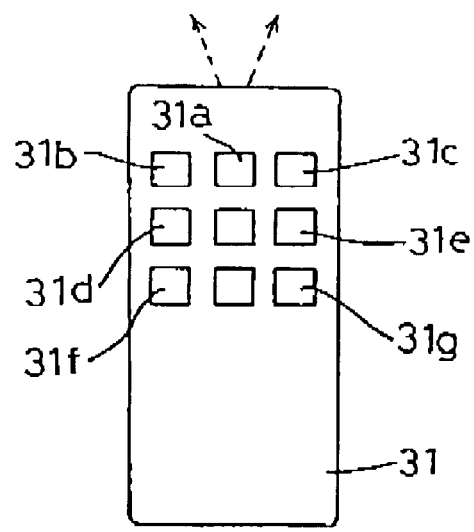
FIG. 5 is a plan view of a remote control.
Figure 7:
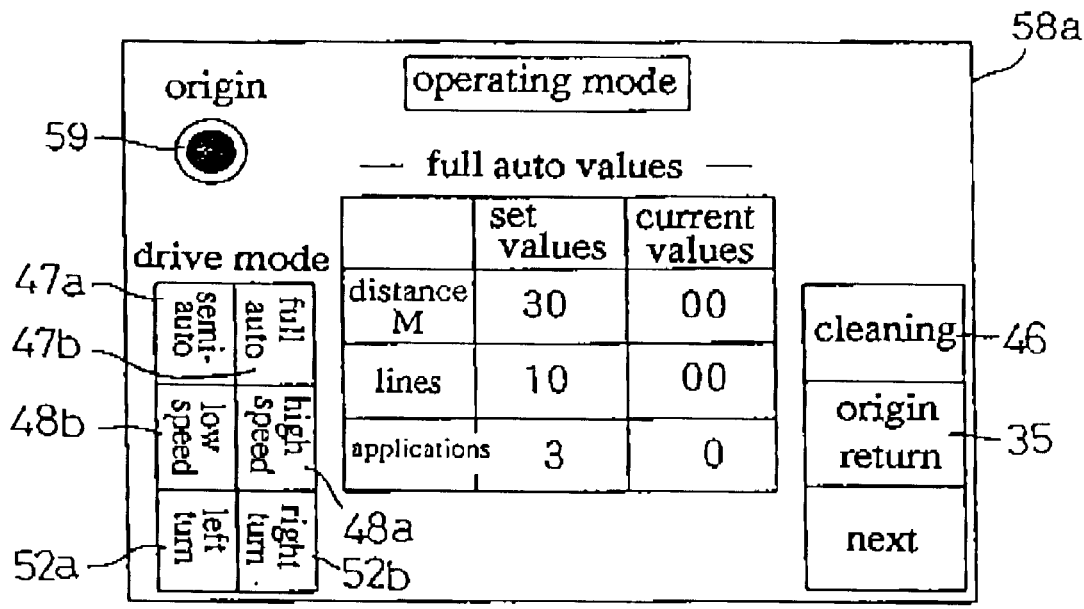
FIG. 7 is an explanatory view of an operating mode selecting mechanism, a speed switching mechanism and a turn setting mechanism.

As shown in FIG. 7, the for control panel 5 has a touch panel displaying a first screen 58*a*. The first screen 58*a* includes the semi-automatic switch 47*a*, full automatic switch 47*b*, high-speed switch 48*a*, low-speed switch 48*b* and origin return switch 356 operable by touching with a fingertip. When the semi-automatic switch 47*a* is operated, the semi-automatic control unit 53*a* becomes operable for automatically controlling the start control device 54, U-turn control device 55 and spin turn control device 56 based on information from the receiver 32, running distance sensor 33, steering angle sensor 34 and applicator position sensor 40. That is, when a remote control 31 as shown in FIG. 5 is used to transmit a U-turn or spin turn command, the semi-automatic control unit 53*a* controls the machine in a semi-automatic operation.

When the full automatic switch 47*b* is operated, the full automatic control unit 53*b* becomes operable for automatically controlling the start control device 54, U-turn control device 55 and spin turn control device 56 based on information from the running distance sensor 33, steering angle sensor 34 and applicator position sensor 40 and a set running program stored in the memory 57. That is, based on the set running program, the full automatic control unit 53*b* controls the machine in a fully automatic operation.

When the high-speed switch 48*a* is operated, the control device 36 switches the propelling motor M2 to a high-speed position. Then the machine runs at high speed whether in the semi-automatic operation or in the fully automatic operation. When the low-speed switch 48*b* is operated, the control device 36 switches the propelling motor M2 to a low-speed position. Then the machine runs at low speed whether in the semiautomatic operation or in the fully automatic operation.

When the origin return switch 35 is operated, the control device 36 automatically operates the steering motor M1 based on information from the origin return switch 35 and a plurality of sensors 38. As shown in FIGS. 3 and 4, the sensors 38 are fixed to the front frame portion 8*a* for detecting a direction of the front wheel 1 based on a rotating position of a turn disk 37 mounted on an upper end of the mounting shaft 21 to be rotatable therewith. The front wheel 1 is set to a straight running direction which is set as a reference for controls. The control device 36 also checks whether or not wax is stored at least in a predetermined quantity in the wax tank T1, based on information from the wax quantity sensor 39. The wax quantity sensor 39 is provided on the tank mount 4 to detect a wax quantity in the wax tank T1 based on the weight of wax tank T1. When the wax quantity in the tank is less than the predetermined quantity, the operation is stopped whether semi-automatic or fully automatic. When the wax quantity in the tank is at least the predetermined quantity, the operation is enabled. That is, when wax is stored at least in the predetermined quantity in the wax tank T1, the machine stands by for a semi-automatic or fully automatic operation with the front wheel 1 set to the straight running direction. At this time, an origin lamp 59 on the first screen 58a is lit. When the wax in the wax tank T1 is less than the predetermined quantity, even the wax diminishes during an operation, a wax shortage lamp (not shown) on the control pane 5 is lit to give an alas.

When the wax becomes less than the predetermined quantity during an operation, the control device 36 automatically stops the machine.

As shown in FIG. 4, the running distance sensor 33 comprises a rotation sensor attached to a side of the front wheel support 20 through a bracket 33a and interlocking the turn control unit to the front axle 1a. The running distance sensor 33 detects rotations of the front wheel 1, and outputs a result of detection in an electric signal to the control device 36. The running distance sensor 33 also detects a running distance of the machine based on the rotations of the front wheel 1, and outputs a result of detection in an electric signal to the control device 36.

As shown in FIG. 4, the steering angle sensor 34 comprises a rotation sensor mounted on an upper surface of the front frame portion 8a through a bracket 34a and interlocking the turn control unit to the mounting shaft 21. Based on a rotating angle of the mounting shaft 21 relative to the front frame portion 8a, the steering angle sensor 34 detects a steering direction and angle to the straight running direction of the front wheel 1, and outputs results of detection in electric signals to the control device 36.

The applicator position sensor 40 is attached to the lift device 17. The applicator position sensor 40 detects switching of the applicator 12 between the lower operative position and the upper contained position based on a position of the lift control 17a of the lift device 17, and outputs a result of detection in an electric signal to the control device 36.

Figure 8:
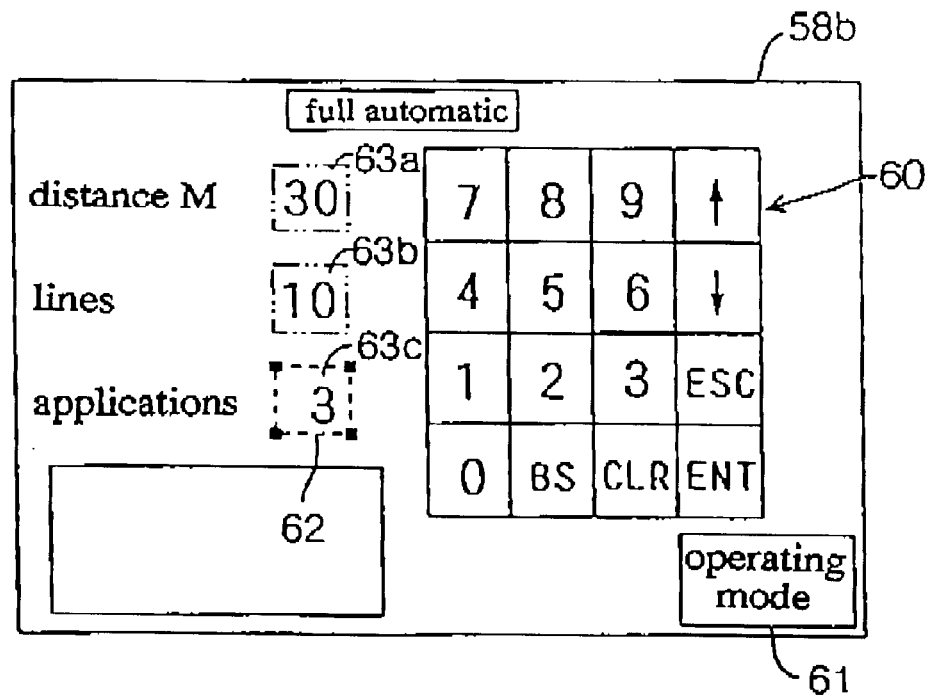
FIG. 8 is an explanatory view of a distance setting mechanism, a line number setting mechanism and a number of application times setting mechanism.
Figure 9:
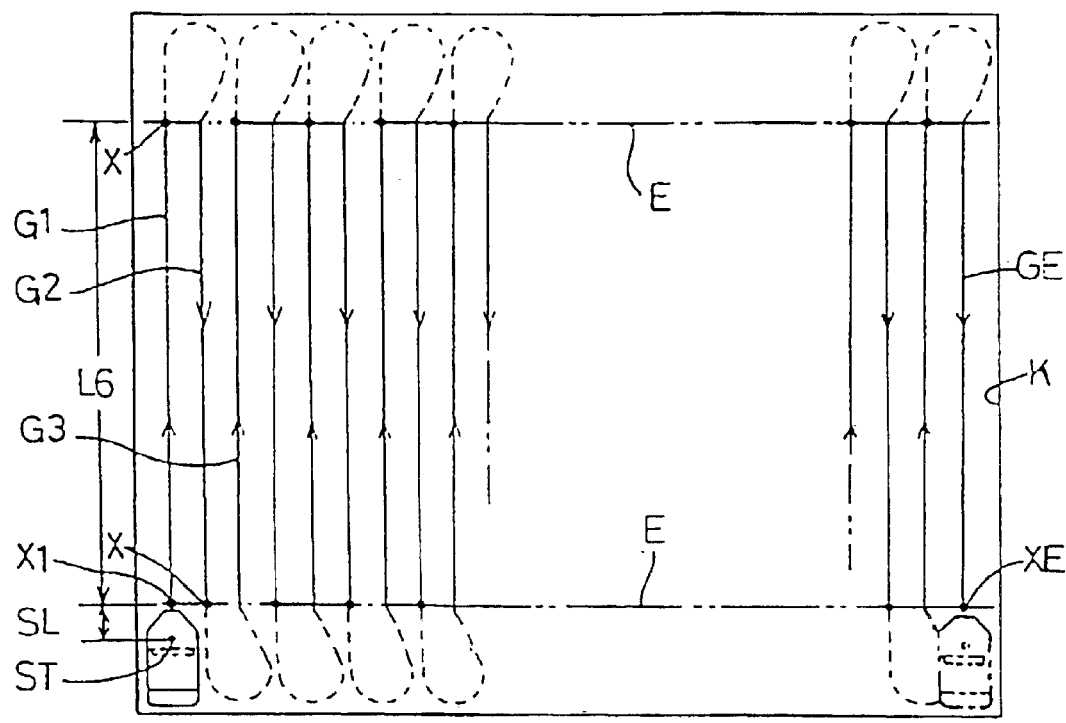
FIG. 9 is an explanatory view of an operating procedure.
Figure 11:
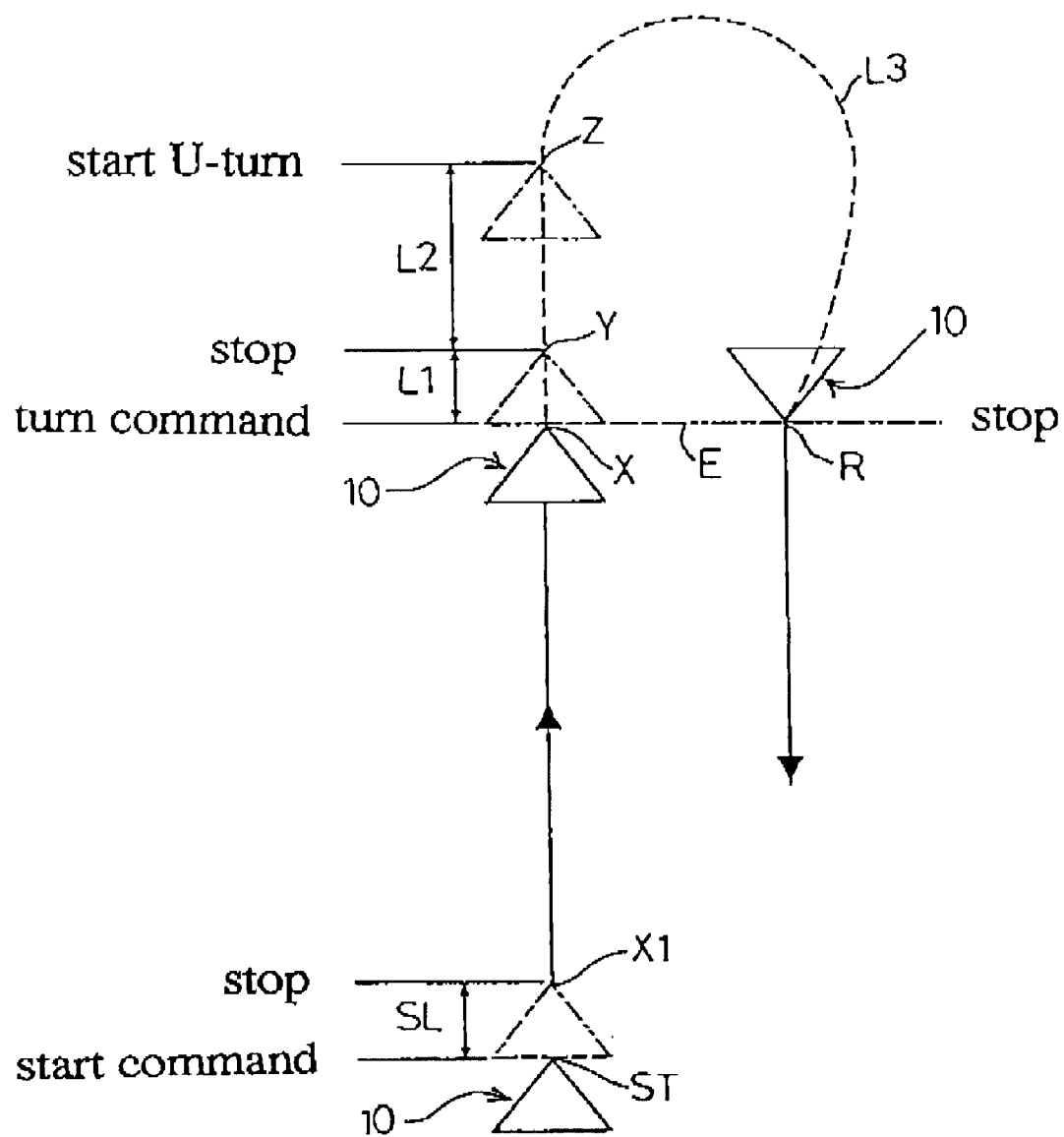
FIG. 11 is an explanatory view of start and U-turn control.

The distance setting mechanism 49, number of lines setting mechanism 50, number of application times setting mechanism 51, and left turn switch 52a and right turn switch 52b of the turn setting mechanism 52 set a program for running the machine in the fully automatic operation. This running program is inputted to and stored in the control device 36. The distance setting mechanism 49, number of lines setting mechanism 50 and number of application times setting mechanism 51 comprise a numeric switch section 60, an operating mode switch 61 and a cursor 62 on a second display screen 58b as shown in FIG. 8 which is displayed on the touch panel in place of the first display screen 58a. The distance setting mechanism 49 sets a distance corresponding a distance the machine runs straight from an application start position X1 to a first turning position X in a working range as shown in FIGS. 9 and 11, and to a straight line distance of one work line between turn position X at one end and turn position X at the other end of the working range. This set distance L6 is inputted to the full automatic control unit 53b and stored in the memory 57. The number of lines setting mechanism 50 sets the number of work lines NR present in the working range. This set number of work lines NR is inputted to the full automatic control unit 53b and stored in the memory 57. The number of application times setting mechanism 51 sets the number of application times NK for waxing each work line in the working range. This set number of application times NK is inputted to the full automatic control unit 53b and stored in the memory 57. The number of application times setting mechanism 51 sets the number of application times NK. For waxing the working range only once, the number of times NK=1 is set. The number of times NK=2 is set for waxing each work line again after waxing it once. Thus, the number of application times setting mechanism 51 sets a numerical value corresponding to the number of times wax is applied to the entire working range. The operating mode switch 61 is operated for causing the cursor 62 to mark a first display section 63a. Selected numeric switches in the numeric switch section 60 are operated for causing a numerical value of set distance L6 to appear in the first display section 63a, thereby inputting set distance L6. The cursor 62 is caused to mark a second display section 63b, and a numerical value of the number of lines NR is caused to appear in the second display section 63b, thereby inputting the number of lines NR. The cursor 62 is caused to mark a third display section 63c, and a numerical value of the number of times NK is caused to appear in the third display section 63c, thereby inputting the number of times NK. The left turn switch 52a and right turn switch 52b of the turn setting mechanism 52 comprise switches included in the first display screen 58a on the touch panel. A leftward or rightward U-turn is set for causing the U-turn control device 55 to turn the machine when the machine reaches the first turn position X from the application start position X1. The set first U-turn direction is inputted to the full automatic control unit 53b and stored in the memory 57. A rightward first U-turn is set by touching the right turn switch 52a with a fingertip. A leftward first U-turn is set by touching the left turn switch 52b with a fingertip.

The remote control 31 transmits commands by infrared signals which are one example of radio signals. However, the remote control 31 in this embodiment is not limited to the infrared type. As shown in FIG. 5, the remote control 31 includes a plurality of control buttons 31a–31g. When these control buttons 31a–31g are operated, the remote control 31 transmits commands corresponding ato the control buttons 31a–31g. A start command is transmitted when control is button 31a is operated. A left U-turn command is transmitted when control button 31b is operated. A right U-turn command is transmitted when control button 31c is operated. A left pivot turn command is transmitted when control button 31f is operated. A right pivot turn command is transmitted when control button 31g is operated. A leftward course correction command is transmitted when control button 31d is operated. A rightward course correction command is transmitted when control button 31e is operated. When the remote control 31 transmits the varied commands noted above to the receiver 32, the receiver 32 outputs corresponding electric signals to the control device 36.

Figure 15:
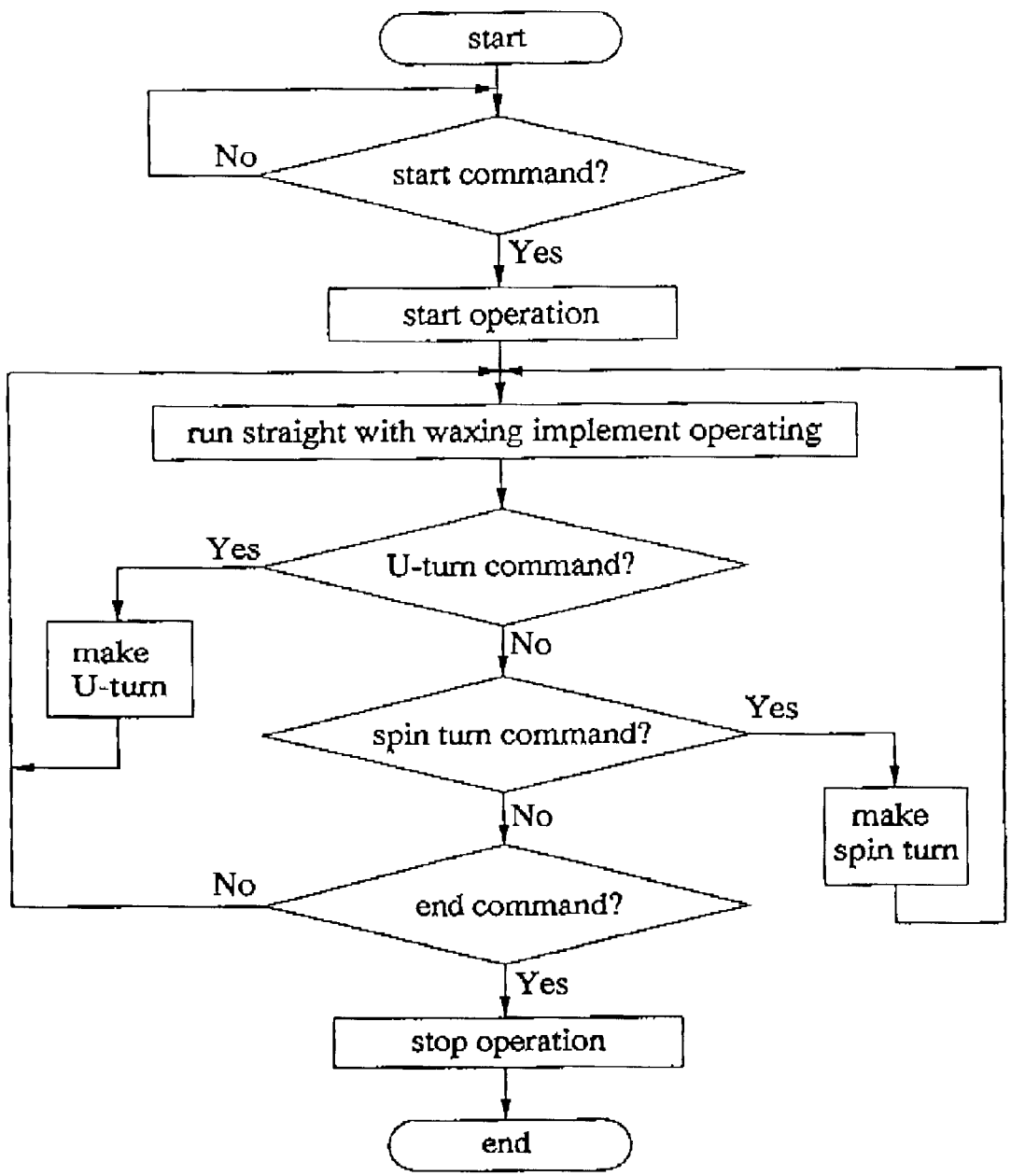
FIG. 15 is a flowchart of semi-automatic control.

The semi-automatic control unit 53a receives information from the receiver 32. The semi-automatic control unit 53a operates automatically based on this information and the control sequence shown in FIG. 15. Specifically, whether or not a start command is inputted from the receiver 32 is checked. If a start command is inputted, the semi-automatic control unit 53a outputs an operate to the start control device 54 to start driving the machine. After the start control, the machine continues to run straight with the waxing implement 10 maintained in operative state. Then, whether or not a U-turn command is inputted from the receiver 32 is checked. If a U-turn command is inputted, the semi-automatic control unit 53a outputs an operate signal to the U-turn control device 55 for causing the machine to make a U-turn. In this case, the machine makes a U-turn in a direction corresponding to a turning direction inputted from the receiver 32 to the semi-automatic control unit 53a. Whether or not a spin turn command is inputted from the receiver 32 is checked. If a spin turn command is inputted, the semi-automatic control unit 53a outputs an operate signal to the spin turn control device 56 for causing the machine to make a spin turn. In this case, the machine makes a spin turn in a direction corresponding to a turning direction inputted from the receiver 32 to the semi-automatic control unit 53a. Further, whether or not an operation ending command is inputted from the receiver 32 is checked. If an operation ending command is inputted, the semiautomatic control unit 53a terminates the operation. That is, the machine is stopped running, and the waxing implement 10 is switched to the inoperative state.

Figure 16:
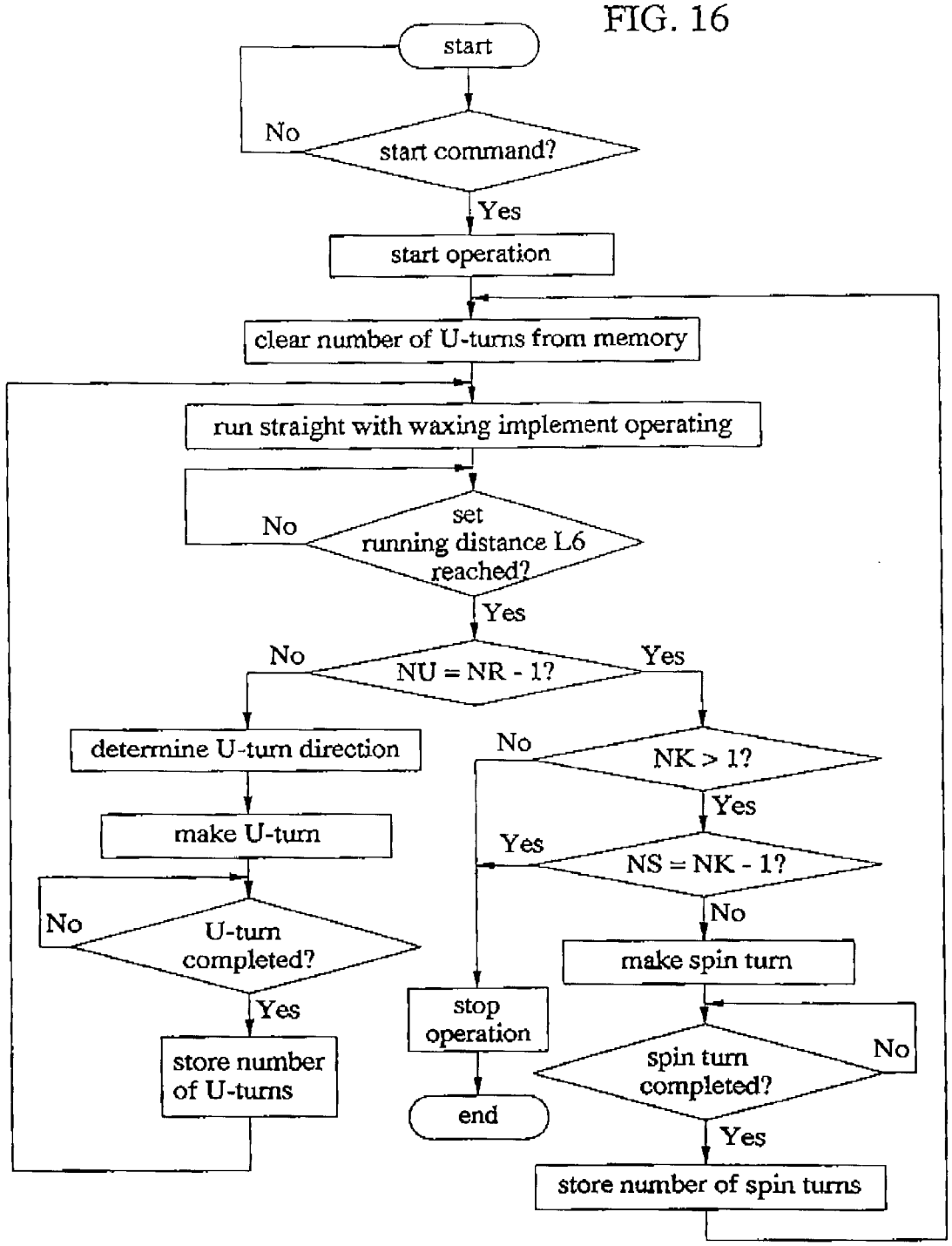
FIG. 16 is a flowchart of full automatic control.

The full automatic control unit 53b receives information from the receiver 32, running distance sensor 33 and memory 57. The full automatic control unit 53b operates automatically based on this information and the control sequence shown in FIG. 16. Specifically, whether or not a start command is inputted from the receiver 32 is checked. If a start command is inputted, the semi-automatic control unit 53a outputs an operate to the start control device 54 to start driving the machine. The memory 57 stores the number of U-turns NU made by the machine under control of the U-turn control device 55. After the start control, the memory 57 is reset to clear this number of U-turns NU therein, for storing the number of U-turns NU all over again. At the same time, the machine continues to run straight with the waxing implement 10 maintained in operative state. The full automatic control unit 53b checks whether the running distance of the machine detected by the running distance sensor 33 has reached distance L6 set to the set running program. If not, the machine is caused to continue running straight. If the set running distance has been reached, the executed number of U-turns NU stored in the memory 57 is compared with a value derived from subtracting 1 from the number of lines NR set to the set running program, to determine if NU equals NR-1. If it does not, a direction of the U-turn to be made this time is determined from the direction of the U-turn made under control of the U-turn control device 55 before the running distance detected by the running distance sensor 33 reached the set running distance L6 and the direction of the first turn set to the running program. That is, if the machine has reached terminal end X of the first work line G1 and no U-turn control has been executed yet, the direction of the U-turn to be made this time is determined to be the same as the direction of the first U-turn set to the program. If the U-turn control has already been executed, the direction of the U-turn to be made this time is determined to be opposite to the direction of the preceding U-turn. Then, the machine is caused to make a U-turn in the direction determined as above, under control of the U-turn control device 55. When this U-turn control is completed, the number of U-turns NU including this latest U-turn is stored in the memory 57, and the machine is driven straight with the waxing implement 10 maintained in operative state. If, in the step noted above, the executed number of U-turns NU is found to equal the value derived from subtracting 1 from the number of lines NR set to the program, the full automatic control unit 53b checks if the number of application times NK set to the program is larger than 1. The operation is stopped if the number of application times NK set to the program is not larger than 1. That is, the machine is stopped running, and the waxing implement 10 is switched to the inoperative state. If the number of application times NK set to the program is larger than 1, the executed number of spin turns NS stored in the memory 57 is compared with a value derived from subtracting 1 from the set number of application times NK. If NS equals NK-1, the operation is stopped. That is, the machine is stopped running, and the waxing implement 10 is switched to the inoperative state. If NS does not equal NK-1, a spin turn is made under control of the spin turn control device 56. In this case, the machine makes a spin turn in the same direction as the U-turn made under control of the U-turn control device 55 before the running distance detected by the running distance sensor 33 reached the set running distance L6. When this spin turn control is completed, the number of spin turns NS made, including this latest spin turn, is stored in the memory 57. The memory 57 is reset to clear the number of U-turns NU therein, for storing the number of U-turns NU all over again. At the same time, the machine continues to run straight with the waxing implement 10 maintained in operative state.

Figure 17:
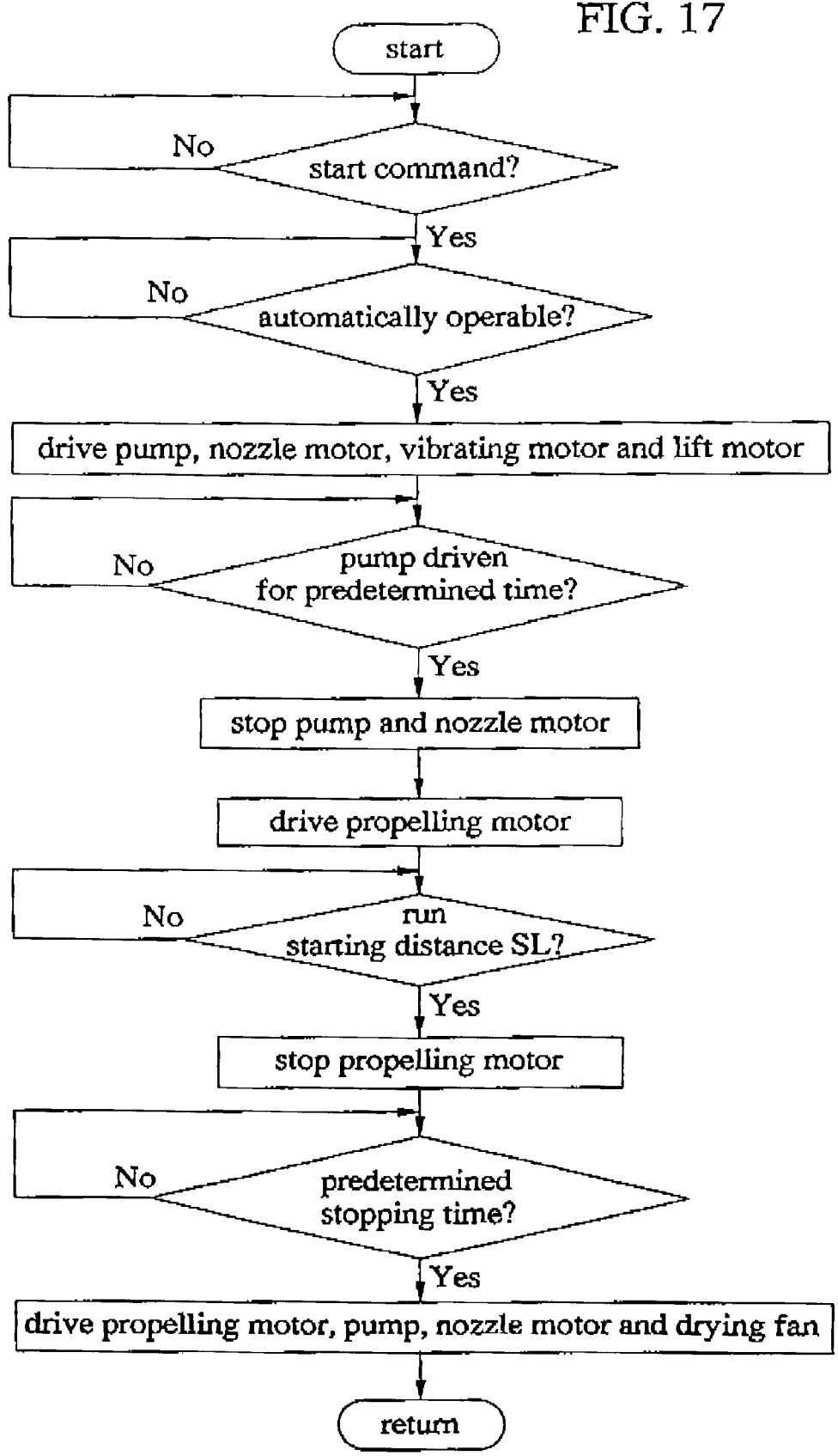
FIG. 17 is a flowchart of start control.

Upon receipt of a signal from the semi-automatic control unit 53a or full automatic control unit 53b, the start control device 54 operates automatically, based on the information from the running distance sensor 33, steering angle sensor 34 and applicator position sensor 40 and the control sequence shown in FIG. 17, for the machine to take starting action as shown in FIG. 11. That is, the start control device 54 checks whether or not the machine is in an automatically operable state (standby for automatic operation). If the machine is in the automatically operable state, the start control device 54 puts the waxing implement 10 in an application ready state by operating the lift motor M5 to the lowering position and driving the pump P, nozzle transfer motor M3 and vibrating motor M4. After the pump P is driven for a predetermined time to complete a preparatory operation, the pump P and nozzle transfer motor M3 are stopped. Thereafter the propelling motor M2 is operated for causing the machine to start running straight. After the machine starts, the start control device 54 checks based on the information from the running distance sensor 33 whether or not the machine has run a predetermined starting distance SL from the start position ST. If the running distance has reached the predetermined starting distance SL, the start control device 54 stops the propelling motor M2 to stop machine once while maintaining the lift motor M5 in the lowering position and driving the vibrating motor M4. The predetermined pump driving time corresponds to the time required for the wax supply nozzle 11 to supply wax in a necessary quantity to be absorbed by the applicator 12. The predetermined starting distance SL equals or is slightly longer than a distance D between the wax supply nozzle 11 and the applicator 12 in the lower, operative position. The applicator 12 is dry at the operation starting time. If the machine continued to run in this state, the applicator 12 would absorb the wax from the wax supply nozzle 11, leaving a floor portion with no or little wax application. To avoid such inconvenience, the applicator 12 is allowed to absorb wax sufficiently. When the stopping time reaches a predetermined stopping time necessary for the applicator 12 to absorb the wax, the propelling motor M2, pump P, nozzle transfer motor M3 and drying fan 13 are driven, the waxing implement 10 is put in the operative state and the machine is driven to run straight. An actual waxing operation for a working range is started at a position X1 at the set starting distance SL from the starting position ST.

Figure 13:
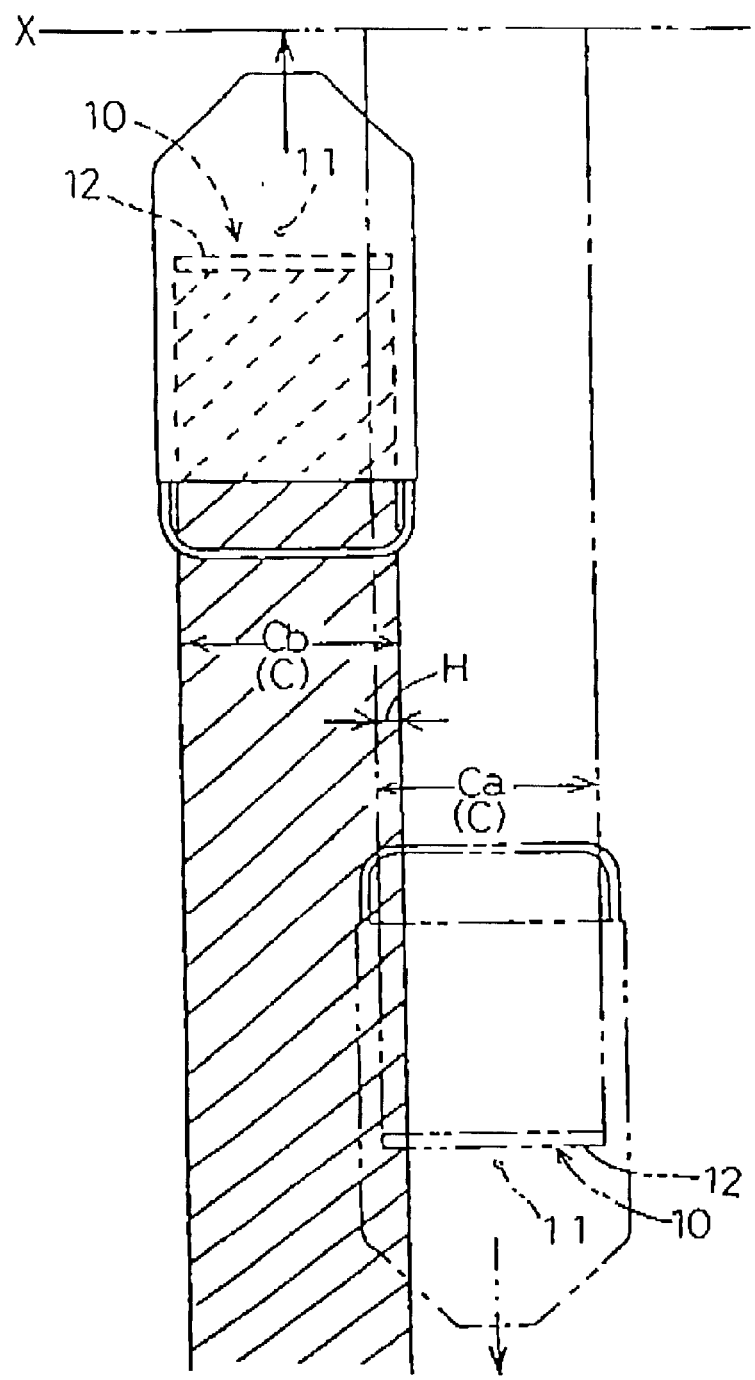
FIG. 13 is an explanatory view of a waxing state after a U-turn.
Figure 18:
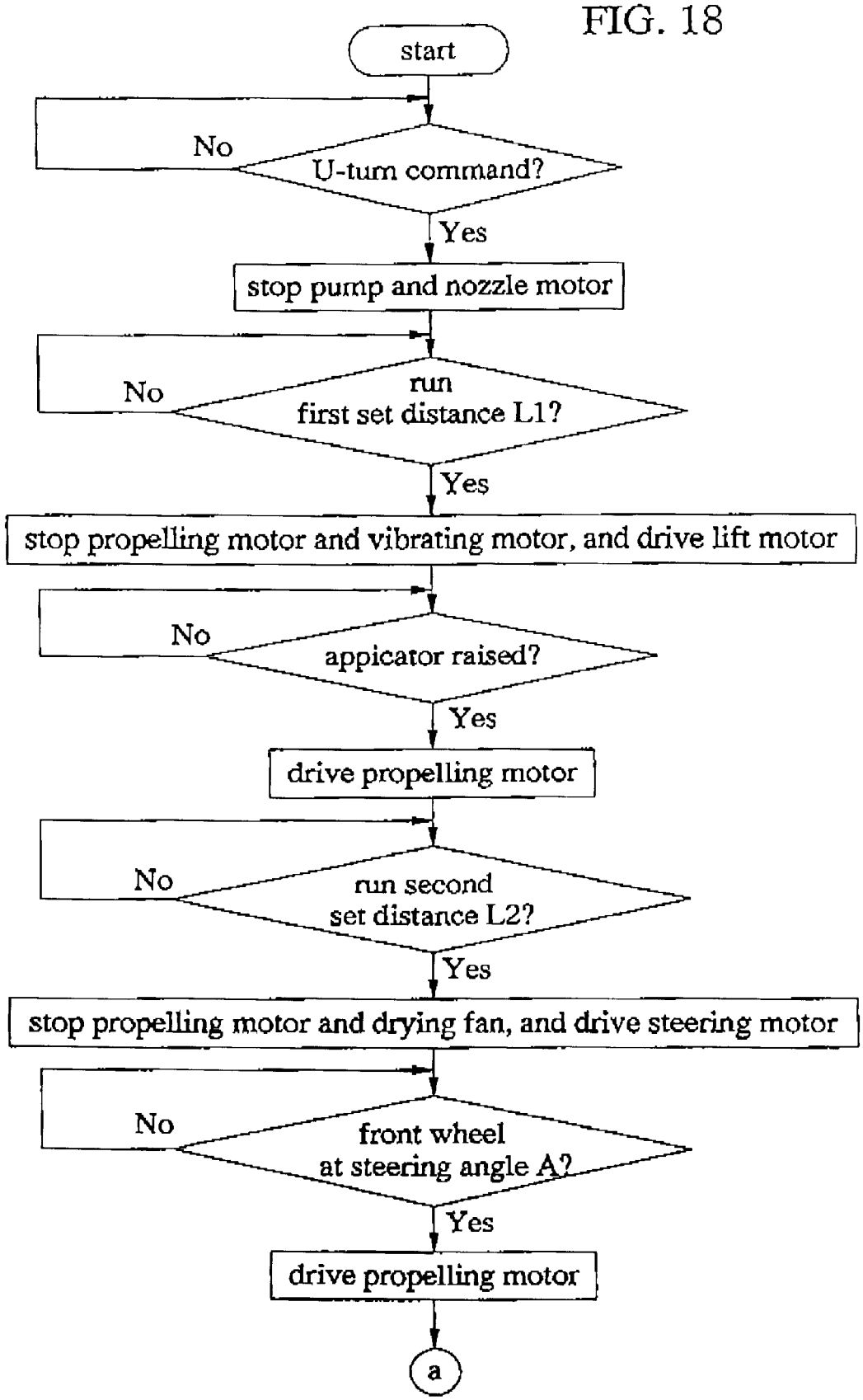
FIG. 18 is a flowchart of U-turn control.
Figure 19:
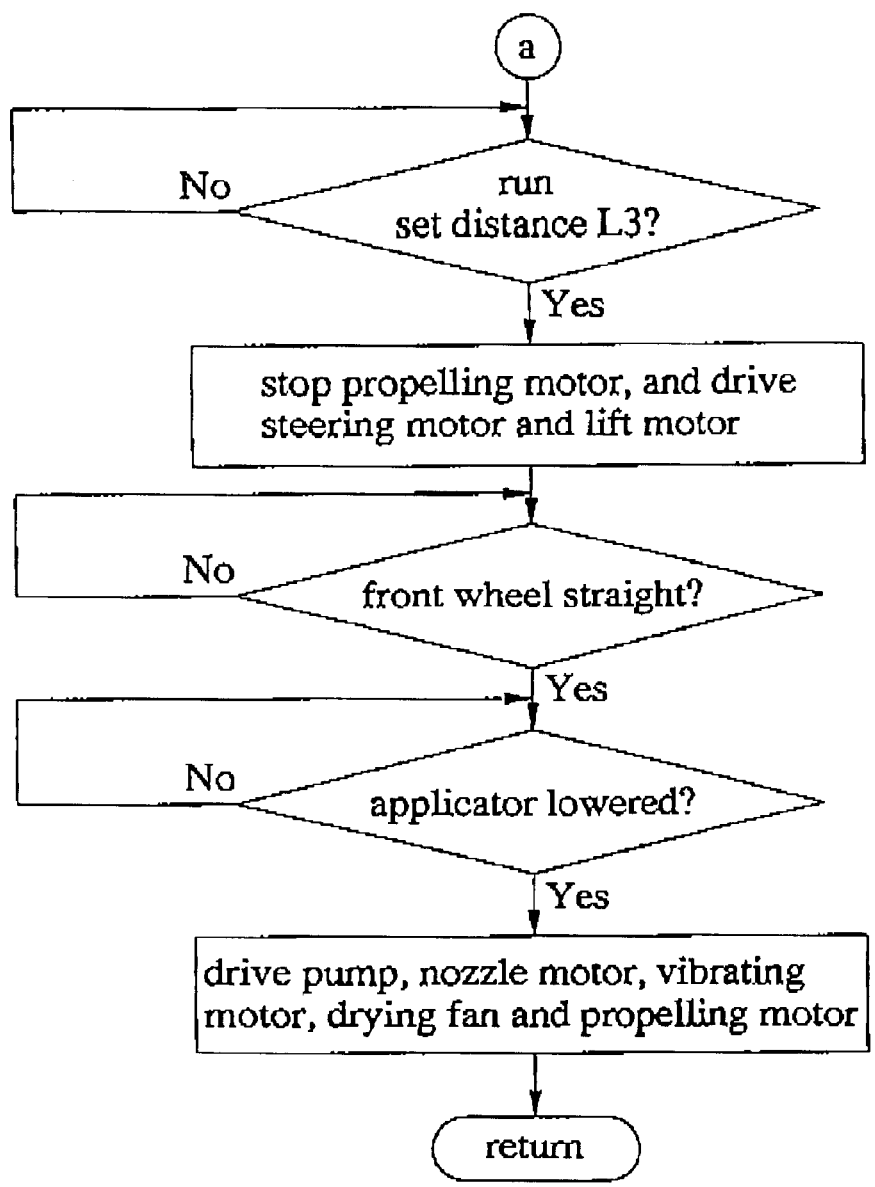
FIG. 19 is a flowchart of U-turn control.

Upon receipt of a signal from the semi-automatic control unit 53a or full automatic control unit 53b, the U-turn control device 55 operates automatically, based on the information from the semi-automatic control unit 53a or full automatic control unit 53b, the information from the running distance sensor 33, steering angle sensor 34 and applicator position sensor 40 and the control sequence shown in FIGS. 18 and 19 for the machine to make a U-turn as shown in FIG. 11. That is, when a U-turn command is determined from the information from the semi-automatic control unit 53a or full automatic control unit 53b, the U-turn control device 55 stops the pump P and nozzle transfer motor M3, and causes the machine to run straight while maintaining the lift motor M5 in the lowering position and driving the vibrating motor M4, driving fan 13 and propelling motor M2. Thereafter the U-turn control device 55 checks, based on the information from the running distance sensor 33, whether or not the machine has run a first predetermined distance L1 straight from a position of turn command reception X. When the machine has run the first predetermined distance L1, the U-turn control device 55 stops the propelling motor M2 and vibrating motor M4 and operates the lift motor MS to the raising position. The U-turn control device 55 switches the waxing implement 10 to the inoperative state while stopping the machine once. The first predetermined distance L1 equals the distance D between the wax supply nozzle 11 and the applicator 12 in the lower, operative position. The wax supply nozzle 11 supplies wax until receipt of the U-turn command. Therefore, the wax supplied until the machine reaches the position of turn command reception X is applied by the applicator 12 after receipt of the turn command. After this step, the applicator 12 is switched from the lower, operative position to the upper, contained position. Thus, the waxing implement 10 is switched to the inoperative state for turning of the machine. The U-turn control device 55 checks, based on the information from the applicator position sensor 40, whether the applicator 12 has moved to the upper, contained position with rotation of the lift motor MS. If the applicator 12 is in the upper, contained position, the U-turn control device 55 drives the propelling motor M2 while maintaining the steering motor M1 in the straight running position, to drive the machine straight from a stopping position Y. Then, the U-turn control device 55 checks, based on the information from the running distance sensor 33, whether or not the machine has run a second predetermined distance L2 straight from the stopping position Y. When the machine has run the second predetermined distance L2, the U-turn control device 55 stops the propelling motor M2 and driving fan 13 and operates the steering motor M1 to a turning position. Consequently, the machine is temporarily stopped and the front wheel 1 is turned left or right from the straight position in accordance with the U-turn command. The U-turn control device 55 checks, based on the information from the steering angle sensor 34, whether the front wheel 1 is set to a predetermined steering angle A with rotation of the steering motor M1. If the front wheel 1 is at the predetermined steering angle A, the U-turn control device 55 turns the machine by driving the propelling motor M2 while maintaining the front wheel 1 at the predetermined steering angle A. Then, the U-turn control device 55 checks, based on the information from the running distance sensor 33, whether or not the machine has run a predetermined distance L3 from a turn starting position Z. When the machine has run the predetermined distance L3, the U-turn control device 55 stops the propelling motor M2, operates the steering motor M1 to the straight running position and operates the lift motor MS to the lowering position. Consequently, the machine is temporarily, stopped, the applicator 12 is lowered, and the front wheel 1 is returned to the straight running position. The U-turn control device 55 checks, based on the information from the steering angle sensor 34 and applicator position sensor 40, whether the front wheel 1 is set to the straight running position and the applicator 12 is set to the lower, operative position with rotation of the steering motor M1 and lift motor MS. If the front wheel 1 is set to the straight running, position, and the applicator 12 is set to the lower, operative position, the U-turn control device 55 drives the pump P, nozzle transfer motor M3, vibrating motor M4, drying fan 13 and propelling motor M2., to cause the machine to run straight with the waxing implement 10 put to the operative state. The second predetermined distance L2, predetermined turning distance L3 and predetermined steering angle A are such that an imaginary straight line extending through a location the wax supply nozzle lies when the machine reaches a stopping position R after making the turn and a location the wax supply nozzle lies when the U-turn command is received crosses the straight running courses at right angles. Further, the above distances and angle are set such that, when the machine runs straight from the stopping position R, a lateral end of the applicator 12 lies inwardly of one end of application width Cb. Consequently, the position of turn command reception X corresponds to the terminal end X of the work line. The U-turn control device 55 drives the machine forward with the front wheel 1 turned slightly sideways from the straight running position. The right and left rear wheels 2 are rotated in opposite directions at different rotating rates by propelling action of the front wheel 1 and contact of the rear wheels 2 with the floor surface. As a result, the machine makes a U-turn describing a curve as shown in broken lines in FIGS. 9 and 11. With this U-turn control, the machine is turned 180 degrees from the pre-turn facing direction. As shown in FIG. 13, the applicator 12 after the turn is adjusted to a work line adjacent the work line treated before the turn. An application width Ca by the applicator 12 after the turn overlaps the application width Cb of the treated work line by a width H. Thus, no floor area is left untreated between the work line treated before the turn and the work line treated thereafter.

Figure 20:
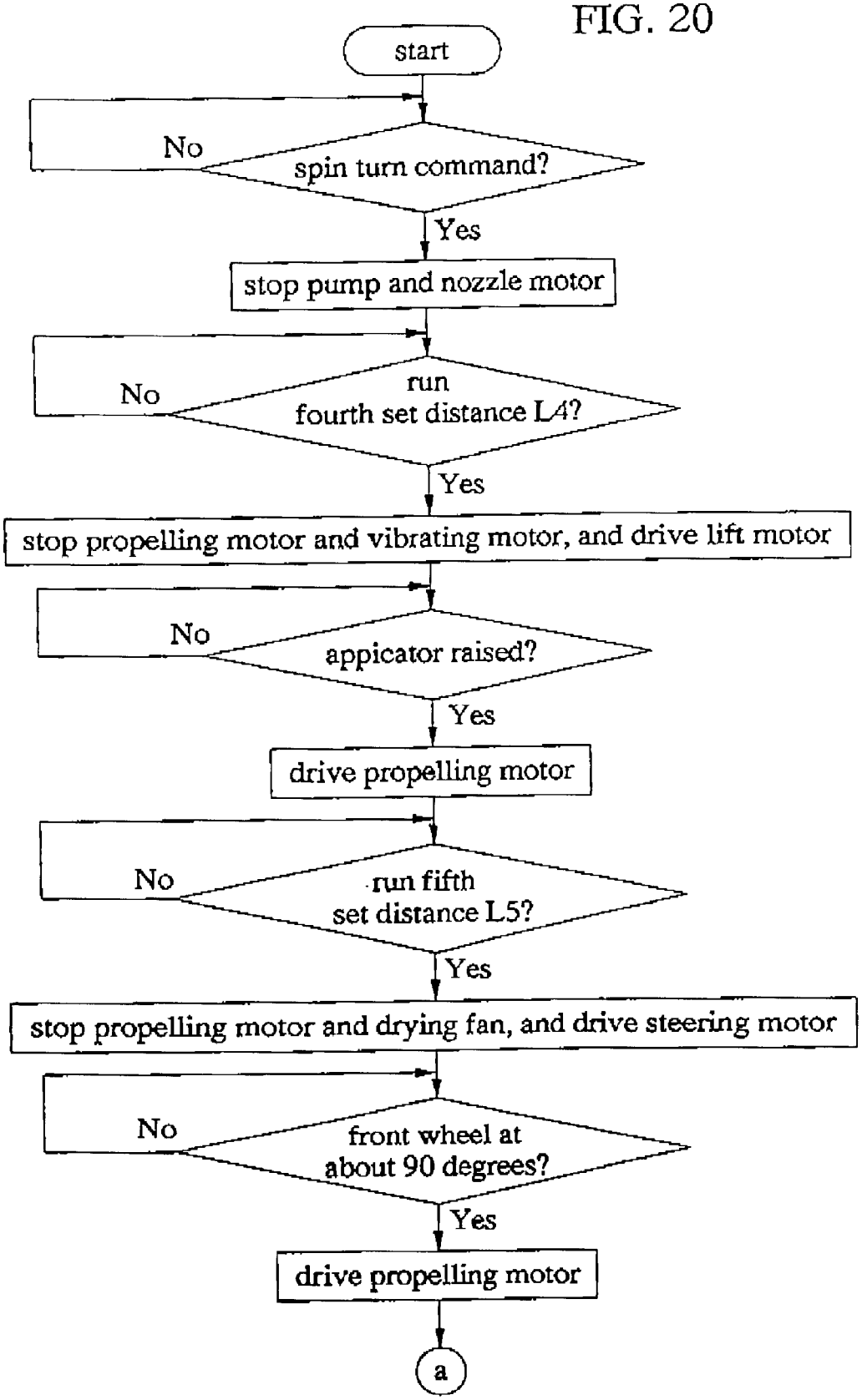
FIG. 20 is a flowchart of spin turn control.
Figure 21:
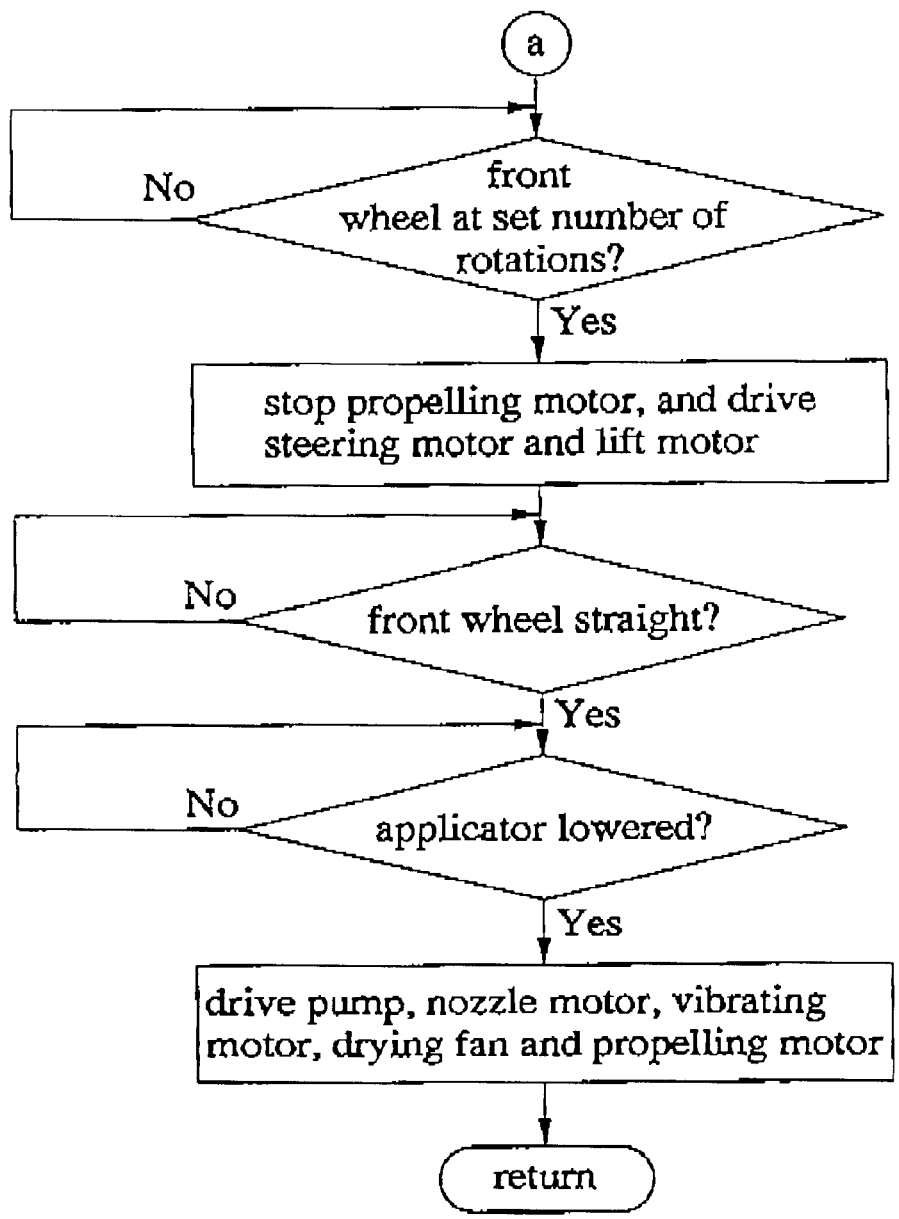
FIG. 21 is a flowchart of spin turn control.

Upon receipt of a single from the semi-automatic control unit 53a or full automatic control unit 53b, the spin turn control device 56 operates automatically, based on the information from the semi-automatic control unit 53a or full automatic control unit 53b, the information from the running distance sensor 33, steering angle sensor 34 and applicator position sensor 40 and the control sequence shown in FIGS. 20 and 21 for the machine to make a U-turn as shown in FIG. 11. That is, when a spin turn command is determined from the information from the semi-automatic control unit 53a or full automatic control unit 53b, the spin turn control device 56 stops the pump P and nozzle transfer motor M3, and causes the machine to run straight while maintaining the lift motor M5 in the lowering position and driving the vibrating motor M4, drying fan 13 and propelling motor M2. Thereafter the spin turn control device 56 checks, based on the information from the running distance sensor 33, whether or not the machine has run a fourth predetermined distance L4 straight from a position of turn command reception X. When the machine has run the fourth predetermined distance L4, the spin turn control device 56 stops the propelling motor M2 and vibrating motor M4 and operates the lift motor M5 to the raising position. The spin turn control device 56 switches the waxing implement 10 to the inoperative state while stopping the machine once. The fourth predetermined distance L4 equals the distance D between the wax supply nozzle 11 and the applicator 12 in the lower, operative position. The wax supply nozzle 11 supplies wax until receipt of the spin turn command. Therefore, the wax supplied until the machine reaches the position of turn command reception X is applied by the applicator 12 after receipt of the turn command. After this step, the applicator 12 is switched from the lower, operative position to the upper, contained position. Thus, the waxing implement 10 is switched to the inoperative state for turning of the machine.

Figure 12:
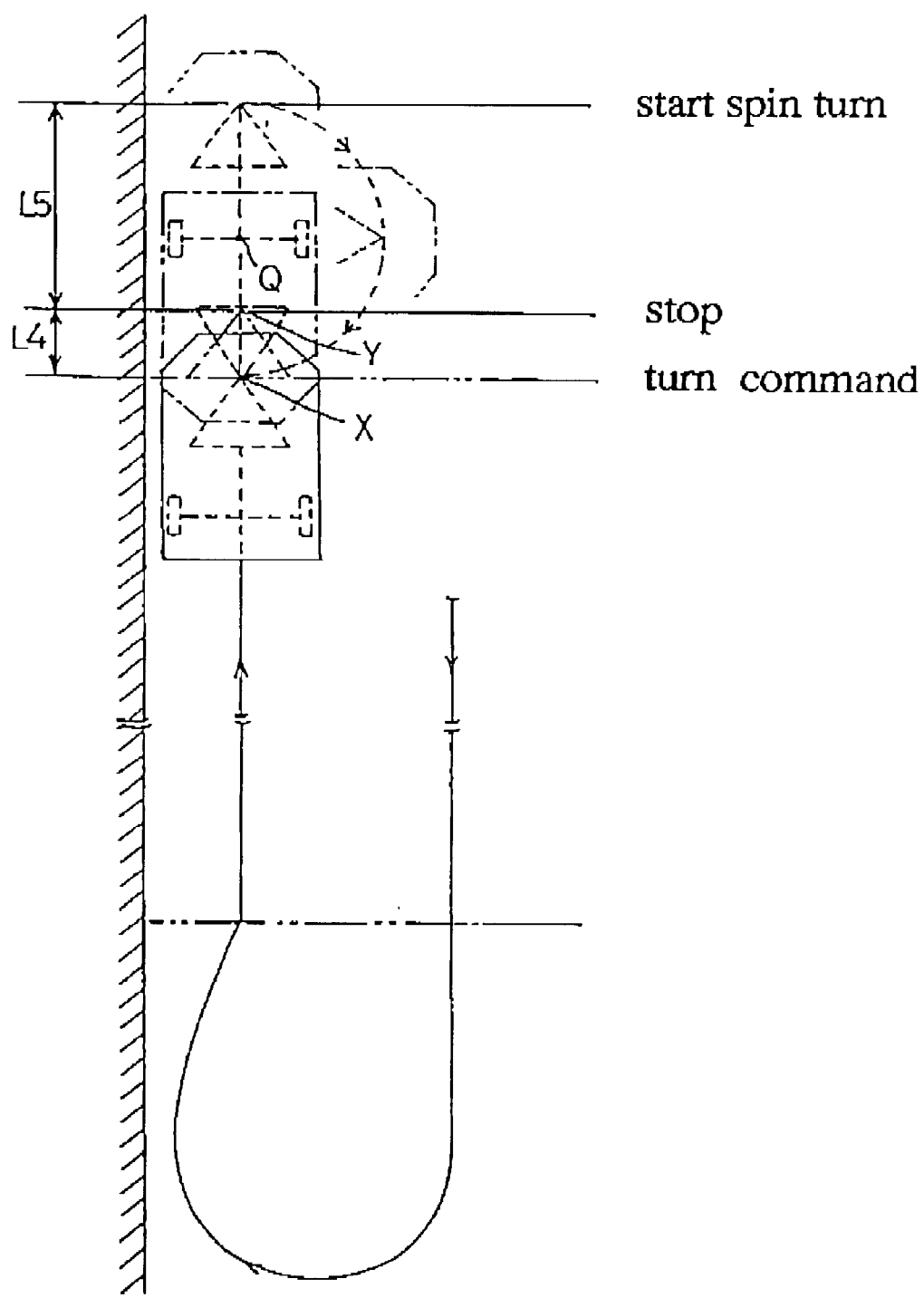
FIG. 12 is an explanatory view of spin turn control.
Figure 14:
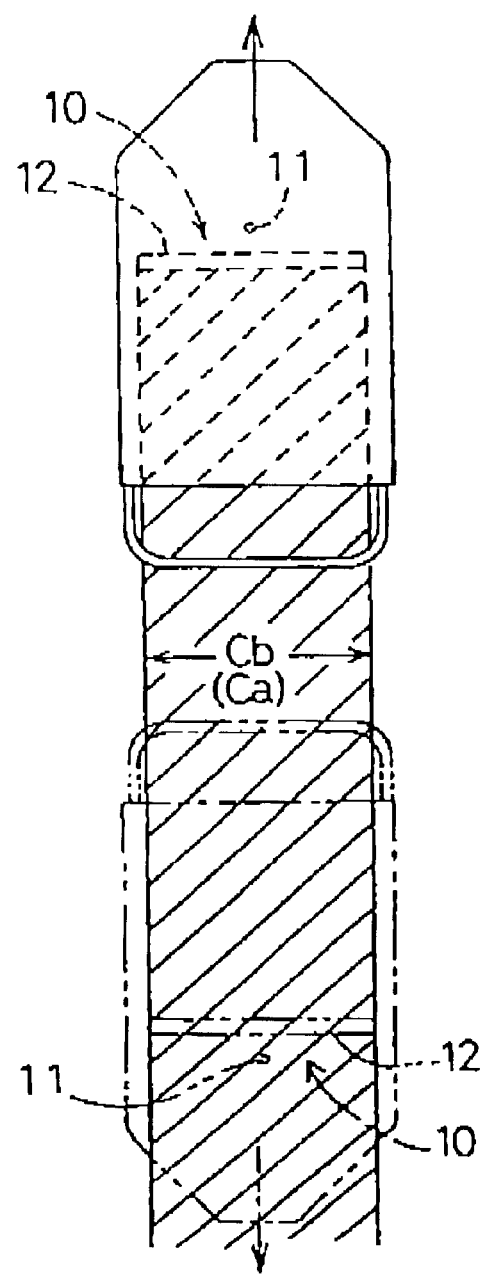
FIG. 14 is an explanatory view of a waxing state after a spin turn.

The spin turn control device 56 checks, based on the information from the applicator position sensor 40, whether the applicator 12 has moved to the upper, contained position with rotation of the lift motor M5. If the applicator 12 is in the upper, contained position, the spin turn control device 56 drives the propelling, motor M2 while maintaining the steering motor M1 in the straight running position to drive the machine straight from a stopping position Y. Then, the spin turn control device 56 checks, based on the information from the running distance sensor 33, whether or not the machine has run a fifth predetermined distance L5 straight from the stopping position Y. When the machine has run the fifth predetermined distance L5, the spin turn control device 56 stops the propelling motor M2 and drying fan 13 and operates the steering motor M1 to a turning position. Consequently, the machine is temporarily stopped and the front wheel 1 is turned left or right from the straight position in accordance with the spin turn command. The spin turn control device 56 checks, based on the information from the steering angle sensor 34, whether the front wheel 1 is steered in a predetermined direction with rotation of the steering motor M1. If the front wheel 1 is steered about 90 degrees from the straight running direction, the spin turn control device 56 turns the machine by driving the propelling motor M2 while maintaining the front wheel 1 at the predetermined steering angle (about 90 degrees). Then, the spin turn control device 56 checks, based on the information from the running distance sensor 33, whether or not the front wheel 1 has reached a predetermined number of rotations N. When the front wheel 1 has reached a predetermined number of rotations N, the spin turn control device 56 stops the propelling motor M2, operates the steering motor M1 to the straight running position and operates the lift motor M5 to the lowering position. Consequently, the machine is temporarily stopped, the applicator 12 is lowered, and the front wheel 1 is returned to the straight running, position. The spin turn control device 56 checks, based on the information from the steering angle sensor 34 and applicator position sensor 40, whether the front wheel 1 is set to the straight running position and the applicator 12 is set to the lower, operative position with rotation of the steering motor M1 and lift motor M5. If the front wheel 1 is set to the straight running position, and the applicator 12 is set to the lower, operative position, the spin turn control device 56 drives the pump P, nozzle transfer motor M3, vibrating motor M4, drying fan 13 and propelling motor M2. M to cause the machine to run straight with the waxing implement 10 put to the operative state. The fifth predetermined distance L5; and predetermined number of rotations N are such that the wax supply nozzle 11, after the spin turn of the machine, lies in or adjacent a location the wax supply nozzle 11 lay when the spin turn command was received. Further, the above distances and number of rotations are set such that, when the machine runs straight from the stopping position after the spin turn, application width Ca by the applicator 12 substantially overlaps the, entire application width Cb before the spin turn. Consequently, the position of turn command reception X corresponds to the terminal end X of the work line and to a starting position X of repeated application. The spin turn control device 56 drives the machine forward with the front wheel 1 turned at about 90 degrees from the straight running position. The right and left rear wheels 2 are rotated in opposite directions at different rotating rates by propelling action of the front wheel 1 and contact of the rear wheels 2 with the floor surface. As a result, the machine makes a spin turn about a middle position Q between the right and left rear wheels 2 as shown in FIG. 12. With this spin turn control, the machine is turned 180 degrees form the pre-turn facing direction. As shown in FIG. 14, the applicator 12 after the turn is adjusted to the work line treated before the turn.

Figure 22:
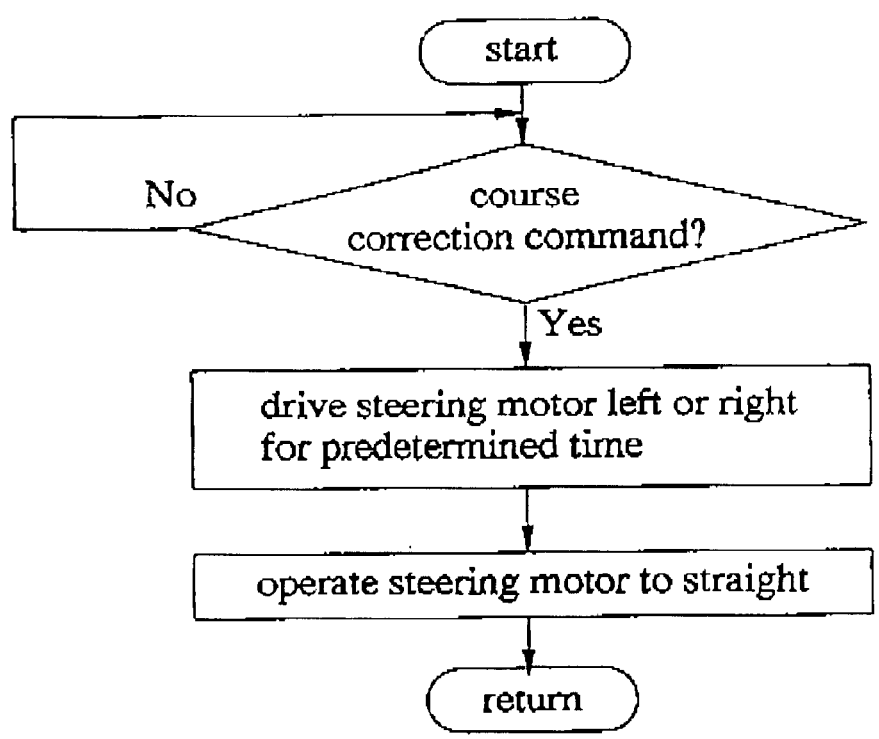
FIG. 22 is a flowchart of course correction control.

The receiver 32 receives a course correction command when the machine is running straight with the waxing implement 10 in the operative state in the semi-automatic operation. Then, the control device 36 operates automatically based on the control sequence shown in FIG. 22.

When the control device 36 determines a course correction command from the information inputted from the receiver 32, the control device 36 operates the steering motor M1 to the left or right turn position in accordance with a turn command, to steer the front wheel 1 left or right. When the control button 31*d* or 31*e* pressed, the steering motor M1 is driven leftward or rightward for a predetermined time. Subsequently, the steering motor M1 is automatically operated to the straight position to return the front wheel 1 to the straight running position.

The waxing operation is carried out as shown in FIG. 9. Whether in semi-automatic operation or in the fully automatic operation, the machine set to the starting position ST on the floor surface to be waxed, the origin return switch 35 is operated, and the remote control 31 is operated to transmit a start command. In response to the signal from the remote control 31, the semi-automatic control unit 53*a* or full automatic control unit 53*b* outputs an operate signal automatically to the start control device 54. Then, in the starting position ST, the applicator 12 is lowered to the operative position and wax is supplied thereto to complete the preparatory operation. The machine runs straight through the starting distance SL to the application starting position X1. The machine is automatically stopped, and the applicator 12 is allowed to absorb enough wax. When the applicator 12 has absorbed enough wax, the machine is automatically started running straight to apply wax over the width C. In the case of semiautomatic operation, the remote control 31 is thereafter operated as follows. The machine having started from the application starting position X1 reaches the opposite end of the first work line 01. When the machine reaches the position X for making a turn with the wax supply nozzle 11 at the terminal end of the first work line G1, the remote control 31 is operated to transmit a right or left U-turn command (right U-turn command in the example shown in FIG. 9) corresponding to the direction in which the machine is turned. Then, in response to the signal from the remote control 31, the U-turn control device 55 automatically outputs an operate signal to the semi-automatic control unit 53*a* to make a U-turn control. As a result, the machine automatically switches the waxing implement 10 to the inoperative state and make a U-turn. After the turn, the machine automatically switches the waxing implement 10 to the operative state and runs straight. The second work line G2 adjacent the first work line G1 is applied with the application width Ca after the turn overlaps the application width Cb treated before the turn by overlap width H. When the machine reaches position X which is the terminal end of the second work line G2 where the machine should make a turn, the remote control 31 is operated to transmit a U-turn command as when turning from the first work line G1 to the second work line G2. At this time, a U-turn is made in the opposite direction to the turn from the first work line G1 to the second work line G2 (left U-turn command in the example shown in FIG. 9). The semi-automatic control unit 53*a* causes the U-turn control device 55 to execute a U-turn control, whereby the machine makes a U-turn from the second work line G2 to the third work line G3 to threat the third work line G3. Thus, each time the wax supply nozzle 11 of the machine teaches the terminal end of a work line, the remote control 31 is operated to transmit a U-turn command for an appropriate turning direction. The U-turn control device 55 executes a U-turn control for causing the machine to turn automatically from the work line to an adjacent work line and to run along the work line after the turn. In this way, the machine runs back and forth and applies wax to the entire floor surface. If a certain work line needs re-treatment, the remote control 31 is operated to transmit a spin turn command when the machine reaches the terminal end X of that work line to be re-treated. In response to the signal from the remote control 31, the semi-automatic control unit 53a automatically outputs an operate signal to the spin turn control device 56 to execute a spin turn control. Then, the machine automatically switches the waxing implement 10 to the inoperative state and makes a spin turn. After the turn, the machine automatically switches the waxing implement 10 to the operative state and runs straight along the same work line in the opposite direction to re-treat the work line. If the entire floor surface needs re-treatment with wax, the remote control 31 is operated to transmit a spin turn command when the machine reaches the terminal end XE of the final work line GE remote from the first work line G1 on the floor surface under treatment. The semi-automatic control unit 53a causes the spin turn control device 56 to execute a spin turn control. Then, the machine runs from the terminal end XE of the final work line GE along all of the work lines in the opposite direction to the previous running direction to re-treat the work lines. In the example shown in FIG. 9, the machine makes a right spin turn without contacting a wall K. The spin turning direction is selected to avoid contact between the machine and wall K, taking account of the relationship between the wall K and the direction in which the machine runs along the final work line GE before the spin turn. The machine in an operating run may deviate from an intended running course due to an inclination or distortion of the floor surface. Then, the remote control 31 is operated to transmit a course correction command. In response thereto, the machine alters the running course for adjustment to the intended running course.

In the case of automatic operation and in the example shown in FIG. 9, a right turning direction is set beforehand as the direction of the first U-turn. The machine having started from the application starting position X1 reaches the opposite end of the first work line G1. When the machine reaches the position X for making a turn with the wax supply nozzle 11 at the terminal end of the first work line G1, the full automatic control unit 53b automatically outputs an operate signal to the U-turn control device 55 to execute a U-turn control. As a result, the machine automatically switches the waxing implement 10 to the inoperative state and make a right U-turn. After the U-turn, the machine automatically switches the waxing implement 10 to the operative state and runs straight. The second work line G2 adjacent the first work line G1 is applied with the application width Ca after the turn overlaps the application width Cb treated before the turn by overlap width H. When the machine reaches the terminal position X of the second work line G2, the full automatic control unit 53b automatically outputs an operate signal to the U-turn control device 55 to make a left U-turn control which is opposite to the turn made from the first work line G1 to the second work line G2. Thus, each time the machine reaches the terminal end of a work line, the U-turn control device 55 executes a U-turn control based on the command from the full automatic control unit 53b, for causing the machine to make a U-turn automatically from the treated work line to an adjacent work line. In this way, a predetermined number NR of work lines are treated. When the machine reaches the terminal end XE of the final work line GE determined by the set number NR of work lines, and if the predetermined number of application times NK is 1, the operation is terminated under control of the full automatic control unit 53b. If the predetermined number of application times NK is 2 or more, the full automatic control unit 53b outputs an operate signal to the spin turn control device 56 to execute a spin turn control. Then the machine automatically makes a spin turn at the final work line GE. The machine automatically runs from the terminal end XE of the final work line GE along all of the set number NR of work lines in opposite direction to the previous running direction to re-treat the work lines. By spin direction setting of the full automatic control unit 53b, the machine makes a spin turn in the same direction as the immediately preceding spin turn, i.e. the spin turn made to the final work line GE from the immediately preceding work line. The spin turn is made without contacting the wall K even if the wall K lies close to the final work line GE. When the machine in the repeated wax applying operation reaches the application starting position X1 of the first work line G1, and if the set number of application times NK is 2, the machine automatically stops the operation under control of the full automatic control unit 53b. If the set number of application times NK is 3 or more, the machine makes a spin turn in the same direction as the spin turn made from the second work line G2 to the first work line G1 as in the case of the spin turn at the final work line GE. The application starting position X1 of the first work line G1 now acts as a turning point. The machine automatically runs from the turning point X1 along all of the set number NR of work lines in the same direction as the running before last to re-treat the work lines. In this way, the machine treats all of the set number NR of work lines the set number of applications times NK. When the machine reaches the terminal end XE of the final work line GE or the application starting position X1 of the first work line 01, whichever is the terminal end of the final work line according to the set number NR of work lines, the machine automatically stops running and terminates the operation under control of the full automatic control unit 53b.

Figure 23:
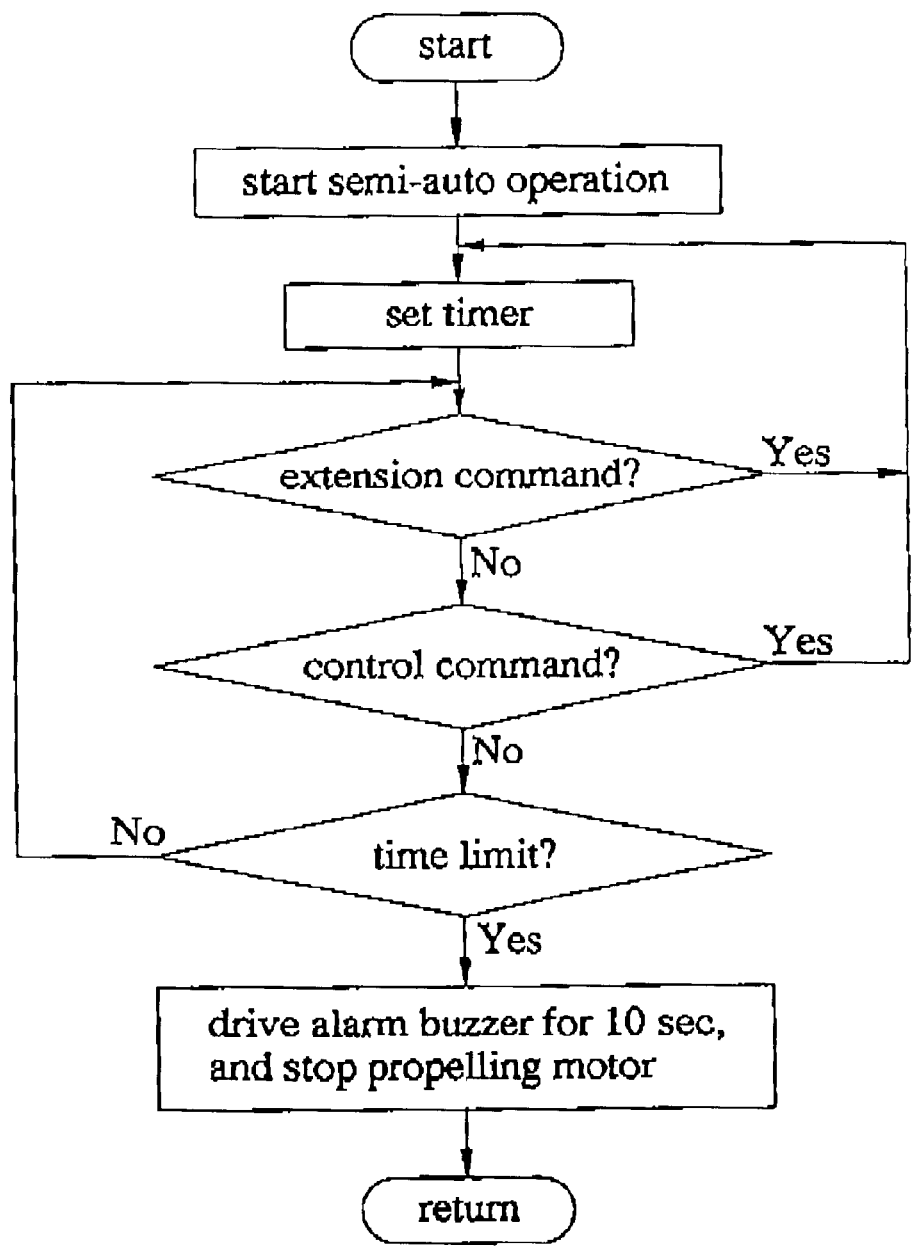
FIG. 23 is a flowchart of semi-automatic operation extension control.

When the receiver 32 receives a start command and the machine starts an operation under control of the semi-automatic control unit 53a, the control device 36 automatically operates according to the control sequence shown in FIG. 23.

When the machine starts operating, a timer is set to measure time from start of the semi-automatic operation. Whether a semi-automatic operation time extension command has been given, and whether a control command for a running course correction, a U-turn or a spin turn has been given, are checked based on the information from the receiver 32. When an extension command or a control command has been given, the timer is reset to measure time all over again from the time the command is given. If no extension command or control command has been given, checking is made whether or not the time from the semi-automatic operation starting time has reached a predetermined time limit. If the predetermined time limit has been reached, an alarm buzzer 41 included in the self-propelled vehicle body is operated for 10 seconds. The propelling motor M2 is stopped upon lapse of two minutes from the semi-automatic operation starting time.

Thus, in the absence of a course correction and a turn, the machine is automatically stopped two minutes from transmission of a start command from the remote control 31 starting the semi-automatic operation. The alarm buzzer 41 is operated 10 seconds before the stop to notify that the machine will stop running. However, when a control is executed to extend the semi-automatic operation time before lapse of two minutes from the semi-automatic operation starting time, the timer is reset to extend the semi-automatic operation time so that the operation will continue for two minutes. The semi-automatic operation time is extended, as in the case of the extension control, when a running course correction control or a turn control is executed. Thus, by executing a running course correction control or a turn control, the semi-automatic operation time is automatically extended to allow a continued operation without specially executing the extension control.

With this automatic stopping function, the machine may be stopped automatically even when the machine moves outside an effective range of the remote control 31. This stopping function prevents the machine from running out of control.

A contact sensor 42 shown in FIG. 6 detects contact between an obstacle such as a wall and a bumper 43 disposed peripherally of a front end of the vehicle body, whereby the control device 36 stops the machine. An emergency switch 44 is disposed on the control panel 5 for causing the control device 36 to bring the machine and the waxing apparatus 10 to an emergency stop. A cleaning switch 46 is used when cleaning the pump P or wax supply nozzle 11. Specifically, the intake hose 11b is removed from the wax tank T1 and connected to the cleaning water tank T2, and the cleaning switch 46 is operated. Then, based on information from the cleaning switch 46, the control device 36 operates the pump P for 60 seconds from time of the switch operation, to supply cleaning water from the cleaning water tank T2 to the wax supply nozzle 11. The indicator light 6 is lit when the origin return switch 35 is operated to render the machine automatically operable, and remains lit while the machine is engaged in the automatic operation.

Figure 10:
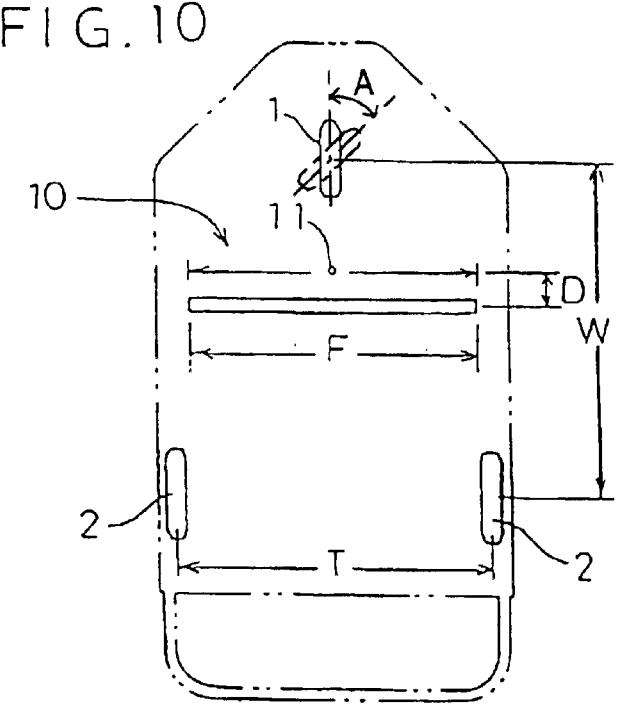
FIG. 10 is an explanatory view of vehicle body specifications.

As shown in FIG. 10, the front wheel 1 and rear wheels 2 have a spacing W therebetween, the right and left rear wheels 2 have a spacing T therebetween, the wax supply nozzle 11 and the applicator 12 in the lower, operative position have a spacing F therebetween, and the applicator 12 has a width F. Where W, T, D and F, and the second set distance L2, set turning distance L3 and set steering angle A are give the following values, the application width Ca after a turn overlaps the application width Cb before the turn by about 5 cm:

front-rear wheel spacing W=77 cm rear wheel spacing T=66 cm nozzle-applicator spacing D=8 cm applicator width F=60 cm second set distance L2=80 cm set turn distance L3=252 cm set steering angle A=67 degrees Besides the waxing machine, this invention is applicable also to a working machine having a cleaning implement for cleaning floor surfaces by suction, a washing implement for washing floor surfaces, or a polishing implement for polishing floor surfaces. Further, the invention is applicable to a working machine for treating floor surfaces formed of varied materials such as wooden, stone or plastic floor surfaces and concrete floor surfaces. Thus, such waxing implement, cleaning implement, washing implement and polishing implement are collectively called the working implement herein. Working machines having such implements are collectively called the floor working machine,

What is claimed is:

1. A floor working machine comprising:
a self-propelled vehicle body including a working implement for treating a floor surface;
U-turn control means for causing said self-propelled vehicle body to make a U-turn automatically to adjust said working implement to a work line adjacent a work line treated before said U-turn; spin turn control means for causing said self-propelled vehicle body to make a spin turn automatically to align said working implement to a work line treated before said spin turn; and running control means for automatically controlling said U-turn control means and said spin turn control means in response to input signals for causing said self-propelled vehicle body to make selectively a U-turn under control of said U-turn control means and a spin turn under control of said spin turn control means.

2. A floor working machine as defined in claim 1, wherein said running control means includes a semi-automatic control unit, said semi-automatic control unit being operable, in response to a U-turn command from a control unit, to control said U-turn control means for causing said self-propelled vehicle body to make a U-turn, and in response to a spin turn command from said control unit, to control said spin turn control means for causing said self-propelled vehicle body to make a spin turn.

3. A floor working machine as defined in claim 1, wherein said running control means includes a semi-automatic control unit, said semi-automatic control unit being operable to control said U-turn control means and said spin turn control means automatically based on a set running program for causing said self-propelled vehicle body to make U-turns at ends of a working range, and when said running program so requires, for causing said self-propelled vehicle body to make spin turns at predetermined turning positions and run in opposite directions.

4. A floor working machine as defined in claim 3, wherein said full automatic control unit is operable to control said spin turn control means for causing said self-propelled vehicle body to make a spin turn in a direction in which a U-turn is made immediately before said spin turn.

5. A floor working machine as defined in claim 1 wherein said self-propelled vehicle body has one dirigible front drive wheel and a pair of right and left non-dirigible, free rotation rear wheels, said spin turn control means being operable to cause said self-propelled vehicle body to make a spin turn about a middle position between said right and left rear wheels by steering sideways and driving said front wheel.

6. A floor working machine as defined in claim 5, wherein said running control means includes a semi-automatic control unit, said semi-automatic control unit being operable, in response to a U-turn command from a control unit, to control said U-turn control means for causing said self-propelled vehicle body to make a U-turn, and in response to a spin turn command from said control unit, to control said spin turn control means for causing said self-propelled vehicle body to make a spin turn.

7. A floor working machine as defined in claim 6, wherein said running control means further includes a full automatic control unit, said full automatic control unit being operable to control said U-turn control means and said spin turn control means automatically based on a set running program, for causing said self-propelled vehicle body to make U-turns at ends of a working range, and when said running program so requires, for causing said self-propelled vehicle body to make spin turns at predetermined turning positions and run in opposite directions.

8. A floor working machine as defined in claim 7, wherein said full automatic control unit is operable to control said spin turn control means for causing said self-propelled vehicle-body to make a spin turn in a direction in which a U-turn is made immediately before said spin turn.

9. A floor working machine as defined in claim 7, wherein said running control means having said U-turn control means, spin turn control means, semi-automatic control unit and full automatic control unit is provided in control means comprising a microcomputer.

10. A floor working machine as defined in claim 9, wherein said control means, comprising a microcomputer is operatively connected to a semi-automatic switch and a full automatic switch of an operating mode selecting mechanism for selecting a semi-automatic operation or a fully automatic operation, a high-speed switch and a low-speed switch of a speed switching mechanism for selecting high speed or low speed, received for receiving signals from said control unit, a running distance sensor, a steering angle sensor, an applicator position sensor, a distance setting mechanism, a number of lines setting mechanism, a number of application times setting mechanism, a left turn switch and a right turn switch of a turn setting mechanism for selecting a left turn or a right turn, an origin return switch and a wax quantity sensor.

11. A floor working machine comprising:

a self-propelled vehicle body including running wheels, wheel drive means, a working implement for treating a floor surface, and means for driving said working implement:

control means for controlling said self-propelled vehicle bode and including:

spin turn control means for causing said self-propelled vehicle body to make a spin turn automatically to align said working implement to a work line treated before said spin turn; and running control means for automatically controlling said spin turn control means in response to an input signal for causing said self-propelled vehicle body to make a spin turn under control of said spin turn control means.

* * * * *